United States Patent
Mital et al.

(10) Patent No.: US 10,379,711 B2
(45) Date of Patent: *Aug. 13, 2019

(54) DATA FEED HAVING CUSTOMIZABLE ANALYTIC AND VISUAL BEHAVIOR

(71) Applicant: Microsoft Technology Licensing, LLC, Redmond, WA (US)

(72) Inventors: Vijay Mital, Redmond, WA (US); Max Uritsky, Redmond, WA (US); Suraj Poozhiyil, Redmond, WA (US); Moe Khosravy, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/794,021

(22) Filed: Jul. 8, 2015

(65) Prior Publication Data

US 2015/0378567 A1 Dec. 31, 2015

Related U.S. Application Data

(63) Continuation of application No. 12/971,685, filed on Dec. 17, 2010, now Pat. No. 9,111,238.

(51) Int. Cl.
*G06F 17/30* (2006.01)
*G06F 3/0484* (2013.01)
(Continued)

(52) U.S. Cl.
CPC ........ *G06F 3/04842* (2013.01); *G06F 16/248* (2019.01); *G06F 16/254* (2019.01); *G06F 16/283* (2019.01); *G06Q 10/06* (2013.01)

(58) Field of Classification Search
CPC ......... G06F 17/30563; G06F 17/30592; G06F 16/254; G06F 16/283
(Continued)

(56) References Cited

U.S. PATENT DOCUMENTS 4,633,430 A 12/1986 Cooper
5,669,007 A * 9/1997 Tateishi ............... G06K 9/2054
715/210

(Continued)

OTHER PUBLICATIONS

"Document Processing System" http://www.wolfram.com/products/mathematica/analysis/content/DocumentProcessingSystems.html, Nov. 16, 2007, 2 Pages.
(Continued)

*Primary Examiner* — Mark E Hershley
(74) *Attorney, Agent, or Firm* — International IP Law Group, PLLC

(57) ABSTRACT

A data marketplace infrastructure allows a data source company or a third party to associate to a data feed with a customizable preview application having analytic and visual features (e.g., business logic and a user interface). A potential customer can use discovery services of the data marketplace infrastructure to identify one or more data feeds offering sample data in a domain of interest of the potential customer. The data feed can transmit the customizable preview application to allow the potential customer to interact with the data from the data feed before purchasing the data. The potential customer may also customize the preview application so as to change the default application behavior in a manner that improves the potential customer's understanding and appreciation of the data feed.

20 Claims, 9 Drawing Sheets

(51) Int. Cl.
*G06F 16/248* (2019.01)
*G06F 16/25* (2019.01)
*G06F 16/28* (2019.01)
*G06Q 10/06* (2012.01)

(58) Field of Classification Search
USPC ........................................................ 707/602
See application file for complete search history.

(56) References Cited

U.S. PATENT DOCUMENTS

| | | | |
|---|---|---|---|
| 5,689,711 A | 11/1997 | Bardasz et al. | |
| 5,867,714 A | 2/1999 | Todd et al. | |
| 6,049,673 A | 4/2000 | McComb et al. | |
| 6,326,962 B1 | 12/2001 | Szabo | |
| 6,512,530 B1 | 1/2003 | Rzepkowski et al. | |
| 6,662,355 B1 | 12/2003 | Caswell et al. | |
| 6,691,100 B1 | 2/2004 | Alavi et al. | |
| 6,694,329 B2 | 2/2004 | Murray | |
| 6,865,720 B1 | 3/2005 | Otani et al. | |
| 6,931,589 B2* | 8/2005 | Baltsan | G06F 17/243 707/999.01 |
| 6,995,768 B2 | 2/2006 | Jou et al. | |
| 7,028,306 B2 | 4/2006 | Boloker et al. | |
| 7,065,493 B1 | 6/2006 | Homsi | |
| 7,263,663 B2 | 8/2007 | Ballard et al. | |
| 7,263,694 B2 | 8/2007 | Clewis et al. | |
| 7,315,305 B2 | 1/2008 | Crotty et al. | |
| 7,315,861 B2* | 1/2008 | Seibel | G06F 17/30719 |
| 7,343,585 B1 | 3/2008 | Lau et al. | |
| 7,349,947 B1 | 3/2008 | Slage et al. | |
| 7,356,559 B1 | 4/2008 | Jacobs et al. | |
| 7,440,902 B2 | 10/2008 | Greenstein et al. | |
| 7,506,243 B2 | 3/2009 | Kotler et al. | |
| 7,603,620 B2 | 10/2009 | Erol et al. | |
| 7,672,950 B2 | 3/2010 | Eckardt, III et al. | |
| 7,752,314 B2* | 7/2010 | Trevor | G06F 17/30699 709/217 |
| 7,752,536 B2 | 7/2010 | Megiddo et al. | |
| 7,774,791 B1* | 8/2010 | Appelbaum | G06Q 10/06 705/1.1 |
| 7,802,230 B1 | 9/2010 | Mendicino et al. | |
| 7,870,545 B2 | 1/2011 | Saha et al. | |
| 7,900,111 B1 | 3/2011 | Kim et al. | |
| 7,908,186 B2 | 3/2011 | Gabelmann et al. | |
| 7,941,791 B2 | 5/2011 | Wang et al. | |
| 8,032,409 B1* | 10/2011 | Mikurak | G06Q 10/00 705/14.39 |
| 8,032,875 B2 | 10/2011 | Kosche et al. | |
| 8,117,606 B2 | 2/2012 | Chakrabarti et al. | |
| 8,135,655 B2* | 3/2012 | Oaten | G06N 5/02 706/13 |
| 8,201,160 B2 | 6/2012 | Hauser | |
| 8,296,666 B2 | 10/2012 | Wright et al. | |
| 8,301,585 B2 | 10/2012 | Mourey et al. | |
| 8,332,772 B2 | 12/2012 | Janzen et al. | |
| 8,429,630 B2 | 4/2013 | Nickolov et al. | |
| 8,473,473 B2 | 6/2013 | Wang et al. | |
| 8,589,172 B2 | 11/2013 | Alonso et al. | |
| 8,635,211 B2 | 1/2014 | Jiang et al. | |
| 8,713,058 B2 | 4/2014 | Nagoski et al. | |
| 8,930,204 B1* | 1/2015 | Igoe | G06F 9/00 705/2 |
| 9,069,557 B2 | 6/2015 | Mital et al. | |
| 9,104,992 B2 | 8/2015 | Mital et al. | |
| 9,110,957 B2 | 8/2015 | Mital et al. | |
| 9,171,272 B2 | 10/2015 | Mital et al. | |
| 9,304,672 B2 | 4/2016 | Mital et al. | |
| 9,336,184 B2 | 5/2016 | Mital et al. | |
| 9,582,475 B2 | 2/2017 | Sekharan | |
| 9,864,966 B2 | 1/2018 | Mital et al. | |
| 2001/0047372 A1 | 11/2001 | Gorelik et al. | |
| 2002/0065673 A1 | 5/2002 | Rooke | |
| 2002/0066782 A1 | 6/2002 | Swaminathan et al. | |
| 2002/0091609 A1 | 7/2002 | Markowski | |
| 2002/0143800 A1 | 10/2002 | Lindberg et al. | |
| 2002/0169658 A1* | 11/2002 | Adler | G06Q 10/06 705/7.28 |
| 2002/0188527 A1* | 12/2002 | Dillard | G06Q 30/06 705/26.1 |
| 2002/0191199 A1 | 12/2002 | Imada et al. | |
| 2003/0040962 A1* | 2/2003 | Lewis | G06Q 30/0225 725/32 |
| 2003/0041104 A1 | 2/2003 | Wingard et al. | |
| 2003/0144868 A1 | 7/2003 | MacIntyre et al. | |
| 2004/0015481 A1* | 1/2004 | Zinda | G06F 17/3061 |
| 2004/0064351 A1* | 4/2004 | Mikurak | G06Q 10/087 705/22 |
| 2004/0098358 A1 | 5/2004 | Roediger | |
| 2004/0117358 A1* | 6/2004 | von Kaenel | G06Q 40/08 |
| 2004/0148586 A1 | 7/2004 | Gilboa | |
| 2004/0153992 A1 | 8/2004 | Molina-Moreno et al. | |
| 2004/0162842 A1 | 8/2004 | Ono et al. | |
| 2004/0163039 A1 | 8/2004 | Goman | |
| 2004/0181519 A1 | 9/2004 | Anwar | |
| 2005/0004911 A1 | 1/2005 | Goldberg et al. | |
| 2005/0043961 A1 | 2/2005 | Torres et al. | |
| 2005/0187809 A1 | 8/2005 | Falkenhainer | |
| 2005/0231392 A1 | 10/2005 | Meehan et al. | |
| 2005/0257157 A1 | 11/2005 | Gilboa et al. | |
| 2006/0037019 A1 | 2/2006 | Austin et al. | |
| 2006/0074882 A1* | 4/2006 | Scherer | G06F 17/30536 |
| 2006/0080400 A1* | 4/2006 | Guha | G06F 17/30902 709/216 |
| 2006/0107211 A1 | 5/2006 | Mirtich et al. | |
| 2006/0178918 A1* | 8/2006 | Mikurak | G06Q 10/06 705/7.25 |
| 2006/0224668 A1* | 10/2006 | Ginis | H04L 67/1002 709/204 |
| 2006/0229853 A1 | 10/2006 | Evans | |
| 2007/0005477 A1 | 1/2007 | McAtamney | |
| 2007/0011175 A1 | 1/2007 | Langseth et al. | |
| 2007/0013697 A1 | 1/2007 | Gilboa | |
| 2007/0021992 A1 | 1/2007 | Konakalla | |
| 2007/0038657 A1 | 2/2007 | Denton et al. | |
| 2007/0046664 A1 | 3/2007 | Raspl et al. | |
| 2007/0061711 A1 | 3/2007 | Bodin et al. | |
| 2007/0094609 A1 | 4/2007 | Gilboa et al. | |
| 2007/0112714 A1* | 5/2007 | Fairweather | G06F 8/427 706/46 |
| 2007/0118394 A1* | 5/2007 | Cahoon | G06Q 30/02 705/1.1 |
| 2007/0124285 A1* | 5/2007 | Wright | G06F 17/30489 |
| 2007/0136326 A1 | 6/2007 | McClement et al. | |
| 2007/0153706 A1 | 7/2007 | Melcher et al. | |
| 2007/0162444 A1 | 7/2007 | Haselden et al. | |
| 2007/0179941 A1 | 8/2007 | Huang et al. | |
| 2007/0185746 A1* | 8/2007 | Chieu | G06Q 10/06 705/7.39 |
| 2007/0250764 A1 | 10/2007 | Jiang et al. | |
| 2007/0265995 A1 | 11/2007 | Remington et al. | |
| 2007/0294614 A1 | 12/2007 | Jacquin et al. | |
| 2008/0040346 A1 | 2/2008 | Aggarwal et al. | |
| 2008/0046919 A1 | 2/2008 | Carmi et al. | |
| 2008/0058969 A1 | 3/2008 | Nixon et al. | |
| 2008/0104496 A1* | 5/2008 | Williams | G06Q 10/107 715/209 |
| 2008/0120111 A1 | 5/2008 | Doyle | |
| 2008/0127052 A1 | 5/2008 | Rostoker | |
| 2008/0163125 A1 | 7/2008 | Gu et al. | |
| 2008/0178083 A1 | 7/2008 | Bergman et al. | |
| 2008/0183710 A1 | 7/2008 | Serjeantson et al. | |
| 2008/0183744 A1 | 7/2008 | Adendorff et al. | |
| 2008/0184140 A1 | 7/2008 | Koerner | |
| 2008/0184167 A1 | 7/2008 | Berrill et al. | |
| 2008/0189438 A1 | 8/2008 | Zimmerer et al. | |
| 2008/0189724 A1* | 8/2008 | Tien | G06Q 10/10 719/329 |
| 2008/0195930 A1 | 8/2008 | Tolle | |
| 2008/0201293 A1 | 8/2008 | Grosset et al. | |
| 2008/0209314 A1* | 8/2008 | Sylthe | G06F 17/217 715/273 |
| 2008/0215559 A1 | 9/2008 | Fontoura et al. | |

(56) References Cited

U.S. PATENT DOCUMENTS

| | | |
|---|---|---|
| 2008/0238925 A1 | 10/2008 | Meehan et al. |
| 2008/0271127 A1 | 10/2008 | Meehan et al. |
| 2008/0288889 A1* | 11/2008 | Hunt .................. G06Q 30/02 715/810 |
| 2008/0294996 A1* | 11/2008 | Hunt .................. G06Q 30/02 715/739 |
| 2008/0301540 A1 | 12/2008 | Sava et al. |
| 2008/0306981 A1 | 12/2008 | Jiang et al. |
| 2008/0307334 A1* | 12/2008 | Chaudhri ............... G06F 3/048 715/764 |
| 2008/0307385 A1* | 12/2008 | Dreiling ................ G06F 8/34 717/108 |
| 2008/0319829 A1* | 12/2008 | Hunt .................. G06Q 30/02 705/7.29 |
| 2009/0006148 A1 | 1/2009 | Bacalski et al. |
| 2009/0007062 A1 | 1/2009 | Gilboa |
| 2009/0037363 A1 | 2/2009 | Kozlov et al. |
| 2009/0049422 A1 | 2/2009 | Hage et al. |
| 2009/0070712 A1 | 3/2009 | Schubert et al. |
| 2009/0083652 A1* | 3/2009 | Krasner ................ G06F 16/25 715/772 |
| 2009/0094674 A1* | 4/2009 | Schwartz ........... H04L 63/0245 726/1 |
| 2009/0100360 A1 | 4/2009 | Janzen et al. |
| 2009/0100407 A1 | 4/2009 | Bouillet et al. |
| 2009/0113146 A1 | 4/2009 | Minz et al. |
| 2009/0125553 A1* | 5/2009 | Dickinson ............. G06F 9/5072 |
| 2009/0138415 A1* | 5/2009 | Lancaster .............. G06N 5/04 706/11 |
| 2009/0138686 A1 | 5/2009 | Gruetzner et al. |
| 2009/0144157 A1* | 6/2009 | Saracino .............. G06Q 30/02 705/14.73 |
| 2009/0144295 A1 | 6/2009 | Mion et al. |
| 2009/0164486 A1 | 6/2009 | Foeldesi et al. |
| 2009/0172024 A1 | 7/2009 | Hsu et al. |
| 2009/0172773 A1 | 7/2009 | Moore |
| 2009/0216758 A1 | 8/2009 | Tuttle et al. |
| 2009/0224941 A1 | 9/2009 | Kansal et al. |
| 2009/0225082 A1* | 9/2009 | Hargrove ............. G06T 11/206 345/440 |
| 2009/0254971 A1* | 10/2009 | Herz .................. G06Q 10/10 726/1 |
| 2009/0287814 A1 | 11/2009 | Robertson et al. |
| 2009/0300544 A1 | 12/2009 | Psenka et al. |
| 2009/0312992 A1 | 12/2009 | Chen et al. |
| 2009/0322739 A1 | 12/2009 | Rubin et al. |
| 2009/0323383 A1 | 12/2009 | Mondaeev et al. |
| 2009/0327878 A1 | 12/2009 | Grandison et al. |
| 2010/0005420 A1 | 1/2010 | Schneider et al. |
| 2010/0042623 A1 | 2/2010 | Feng et al. |
| 2010/0049686 A1 | 2/2010 | Gotz et al. |
| 2010/0057753 A1 | 3/2010 | Gotz et al. |
| 2010/0070448 A1* | 3/2010 | Omoigui ............. H01L 27/1463 706/47 |
| 2010/0070489 A1 | 3/2010 | Aymeloglu et al. |
| 2010/0088258 A1* | 4/2010 | Oaten .................. G06N 5/02 706/13 |
| 2010/0095269 A1 | 4/2010 | Bouillet et al. |
| 2010/0100561 A1* | 4/2010 | Cooper ............... G06Q 10/067 707/769 |
| 2010/0100899 A1* | 4/2010 | Bradbury ........... H04N 7/17318 725/29 |
| 2010/0106853 A1 | 4/2010 | Kashiyama et al. |
| 2010/0131255 A1 | 5/2010 | Beckman et al. |
| 2010/0131293 A1 | 5/2010 | Linthicum .............. G06Q 50/24 705/3 |
| 2010/0138231 A1 | 6/2010 | Linthicum ............ G06F 19/321 705/2 |
| 2010/0138753 A1* | 6/2010 | Riggs .................. G06F 17/3089 715/745 |
| 2010/0145902 A1* | 6/2010 | Boyan ................. G06F 17/3089 706/54 |
| 2010/0158048 A1 | 6/2010 | Arimilli et al. |
| 2010/0161576 A1 | 6/2010 | Chen et al. |
| 2010/0179951 A1 | 7/2010 | McPhail |
| 2010/0185968 A1* | 7/2010 | Hsu .................. G06Q 30/02 715/771 |
| 2010/0198697 A1* | 8/2010 | Brown ................ G06Q 30/02 705/14.73 |
| 2010/0199181 A1 | 8/2010 | Robertson et al. |
| 2010/0199184 A1 | 8/2010 | Horowitz et al. |
| 2010/0205178 A1 | 8/2010 | Bush et al. |
| 2010/0205238 A1 | 8/2010 | Cao et al. |
| 2010/0241620 A1 | 9/2010 | Manister et al. |
| 2010/0250931 A1 | 9/2010 | Andersen et al. |
| 2010/0287014 A1 | 11/2010 | Gaulin et al. |
| 2010/0287459 A1 | 11/2010 | Mital et al. |
| 2010/0332404 A1 | 12/2010 | Valin |
| 2011/0029636 A1 | 2/2011 | Smyth et al. |
| 2011/0047525 A1 | 2/2011 | Castellanos et al. |
| 2011/0072000 A1* | 3/2011 | Haas ................ G06F 17/30643 707/709 |
| 2011/0072001 A1* | 3/2011 | Basu ................ G06F 17/30905 707/709 |
| 2011/0072046 A1* | 3/2011 | Chi .................. G06F 17/30693 707/773 |
| 2011/0078101 A1 | 3/2011 | Gotz et al. |
| 2011/0078160 A1 | 3/2011 | Gotz et al. |
| 2011/0093430 A1* | 4/2011 | B'Far ................ G06N 5/04 706/55 |
| 2011/0131253 A1 | 6/2011 | Peukert et al. |
| 2011/0131588 A1 | 6/2011 | Allam et al. |
| 2011/0173570 A1* | 7/2011 | Moromisato .......... G06Q 10/10 715/838 |
| 2011/0179020 A1* | 7/2011 | Ozzie ................ G06F 17/3089 707/723 |
| 2011/0225417 A1* | 9/2011 | Maharajh ............... G06F 21/10 713/150 |
| 2011/0231385 A1 | 9/2011 | Wang et al. |
| 2011/0238653 A1 | 9/2011 | Wang et al. |
| 2011/0271293 A1* | 11/2011 | Huegel ................ G06Q 30/02 725/1 |
| 2011/0295793 A1 | 12/2011 | Venkatasubramanian et al. |
| 2011/0295795 A1 | 12/2011 | Venkatasubramanian et al. |
| 2011/0295853 A1 | 12/2011 | Li et al. |
| 2011/0314007 A1 | 12/2011 | Dassa et al. |
| 2012/0054147 A1 | 3/2012 | Goetz et al. |
| 2012/0158643 A1 | 6/2012 | Mital et al. |
| 2012/0158644 A1 | 6/2012 | Mital et al. |
| 2012/0158731 A1 | 6/2012 | Gherman et al. |
| 2012/0158732 A1 | 6/2012 | Mital et al. |
| 2012/0158754 A1 | 6/2012 | Mital et al. |
| 2012/0159312 A1 | 6/2012 | Mital et al. |
| 2012/0159333 A1 | 6/2012 | Mital et al. |
| 2012/0159465 A1 | 6/2012 | Mital et al. |
| 2015/0302074 A1 | 10/2015 | Mital et al. |
| 2015/0331918 A1 | 11/2015 | Mital et al. |
| 2015/0378567 A1 | 12/2015 | Mital et al. |
| 2015/0379108 A1 | 12/2015 | Mital et al. |
| 2017/0154089 A1 | 6/2017 | Sherman |
| 2017/0300461 A1 | 10/2017 | Mital et al. |

OTHER PUBLICATIONS

"Introduction to the XML Pipeline Definition Language (XPL)"—Retrieved Date: Sep. 15, 2010; http://www.orbeon.com/orbeon/doc/reference-xpl-pipelines, 24 pages.

"Optimizing forms processing"—Retrieved Date: Sep. 15, 2010; http://www.movetonow.com/content/optimizing_forms_processing, 2 pages.

Frisch, et al., "Streaming XML transformations using term rewriting" http://pauillac.inria.fr/~frisch/xstream/long.pdf, 2007, 13 Pages.

Gardarin, et al. "XML-based Components for Federating Multiple Heterogeneoius Data Sources", Lecture Notes in Computer Science, http://dntt.free.fr/public/er1999.pdf, 1999, 14 pages.

Jelinek, et al., "XML Visualization Using Tree Rewriting" http://mummy.intranet.gr/includes/docs/Conferences/_02_XMLvisualization-Jelinek-SCCG04.pdf, 2004, 14 Pages.

Page, S., "XSL Pipeline Processing" http://www.usingxml.com/Transforms/XslPipelines, Jul. 2, 2007, 6 pages.

(56) References Cited

OTHER PUBLICATIONS

"How to Customize Ubuntu into your own custom distribution," Retrieved at <<http://www.linuxquestions.org/questions/ubuntu-63/how-to-customize-ubuntu-into-your-own-custom-distribution-663412/>>, Aug. 17, 2008, 10 pages.

"LeoStatistic-building histogram, curve fit, multivariate regression, data modeling software", Retrieved at «http://www.leokrut.com/leostatistic.html» Retrieved Date Sep. 21, 2010, 6 Pages.

"Publishing applications to market place", Retrieved at <<https://help.creator.zoho.com/Publishing-applications-to-market-place.html>>, Retrieved Date Nov. 26, 2010, 5 pages.

"Square your search results with Google Squared", Retrieved at <<http://googleblog.blogspot.com/2009/06/square-your-search-results-with-google.html>>, Jun. 2009, 4 pages.

"User Customization", Retrieved at «http://docstore.mik.ua/orelly/perl3/tk/ch16_01.htm», Retrieved Date Nov. 26, 2010, 4 Pages.

"Windows Azure and Cloud Computing," Retrieved at <<http://oakleafblog.blogspot.com/2010/09/windows-azure-and-cloud-computing-posts 09.html», Sep. 9, 2010, 68 Pages.

Ayachit et al., "Customizing ParaView," Retrieved at «http://www.itk.org!Wiki/imaoes/7/77/Brandina oaper.pdf>>, Oct. 2009, 3 pages.

Banerjee, Atanu, "The 2007 Microsoft Office System and Other Platform Technologies for Building Composite Applications", Retrieved at «http://msdn.microsoft.com/en-us/librarv/bb220802.asox», Dec. 2006, 14 Pages.

Biddick, Michael "Six Questions to Ask Before Buying End-to-End APM", Retrieved at <<http://www.networkcomputing.com/end-to-end-apm/6-questions-to-ask-before-buying-end-to-end-aom.pho», Jun. 21, 2010, 9 Pages.

Collins, J., "Using Innovation in Technology to Create New Business Models," Retrieved at «http://www.theshiftonline.com/?p=666», Oct. 25, 2010, 3 Pages.

Delaney, A., "Direct Data Feed Services," Retrieved at «http://www.a-teamgroup.com/?dl id=7460&dl cm=on&dl la=O&dl ls=O», Jun. 2010, 8 pages.

Janeiro, et al., "Improving the Development of Service-Based Applications Through Service Annotations," Retrieved at «http://www.m.int.tu-dresden.de/uoloads/Publikationen/AnnotationPaperVI/WW-Intemet2009.pdf», 2009, 8 pages.

Johnson, et al., "Building ETL Processes for Business Intelligence Solutions," Retrieved at <<http://www.ca.com/files/whitepapers/ca-erwin-building-etl-processes-sql-wp-us-en. pdf>>, Jul. 10, 2008, 6 Pages.

McNee et al., "Creating Auction Ads for Marketplaces," Retrieved at «http://e-articles.info/e/a/title/Creatina-Auction-Ads-for-Marketplaces/», Apr. 2007, 2 Pages.

Mostarda et al., "MU: an hybrid language for Web Mashups," Retrieved at «http://em-up.googlecode.com/svn/wiki/papers/www2009.pdf», 2009, 10 pages.

Nagel, Nick, "Enterprise Data Modeling Using XML Schema," Retrieved at «http://citseerx.ist.psu.edu/viewdoc/download?doi=10.1.1.135.6120&rep=rep1&type=pdf», 2007, 30 pages.

Ravindran, Karthik, "Integrating LOB Systems with the Microsoft Office System," Retrieved at «htto://msdn.microsoft.com/en-us/librarv/bb896607.aspx»Nov. 2007, 18 Pages.

Spillner et al., "Flexible Human Service Interfaces," Retrieved at «http://citeseerx.ist.psu.edu/viewdoc/download?doi=10.1.1.70.7734&rep=rep1 &type=pdf», 2007, 7 Pages.

White, Colin J., "IBM enterprise analytics for the intelligent e-business," Retrieved at «http://sysdoc.doors.ch/IBM/bi.pdf», Sep. 2001, 34 Pages.

Berg, Dr. Bjarne, "A comprehensive guide to SAP NetWeaver Visual Composer", 2009, SAP insider. 81 Pages.

Cheng, et al., "An Ontology-Based Business Intelligence Application in a Financial Knowledge Management System", 2008, pp. 3614-3622.

Zhang, et al., "A Feasible Enterprise Business Intelligence Design Model", 2009, pp. 182-187.

Zhang, et al., "Improvement Design on the Data Structure of Business Intelligence", 2011, pp. 313-321.

Ren, Zhijun, "Practicing for Business Intelligence Application with SQL Server 2008", 2010, pp. 1499-1503.

Evans, Will, "Dynamic Visualization: Introduction & Theory", Available at: http://web.archive.org/web/20090609074938/http://blog.semanticfoundry.com/2009/06/01/dynamic-visualization-introduction-theory, Jun. 0, 2009, 4 pages.

Hibino, "Processing Incremental Multidimensional Range Queries in a Direct Manipulation Visual Query Environment", In Proceedings of the IEEE 14th International Conference on Data Engineering, Feb. 23, 1998, 8 Pages.

Tory, et al., ""Rethinking Visualization: A High-Level Taxonomy"", Available at:http://citeseerx.ist.psu.edu/viewdoc/download?doi=10.1.1.94.2968&rep=rep1&type=pdf, Jan. 2005, 8 Pages.

Webb, et al., "The In-Context Slider: A Fluid Interface Component for Visualization and Adjustment of Values while Authoring", In Proceedings of the Working Conference on Advanced Visual Interfaces, May 28, 2008, 8 Pages.

Yi, et al., "Dust & Magnet: Multivariate Information Visualization Using a Magnet Metaphor", Information Visualization, vol. 4, Issue 4, 2005, 29 Pages.

Non-final Office Action in U.S. Appl. No. 12/972,205, dated Nov. 26, 2012, pp. 33.

Final Office Action in U.S. Appl. No. 12/972,205, dated Jun. 7, 2013, pp. 35.

Non-final Office Action in U.S. Appl. No. 12/972,205, dated Apr. 22, 2015, pp. 32.

Notice of Allowance in U.S. Appl. No. 12/972,205, dated Sep. 14, 2015, pp. 17.

Non-final Office Action in U.S. Appl. No. 12/971,462, dated Mar. 21, 2013, filed Dec. 17, 2010, pp. 21.

Final Office Action in U.S. Appl. No. 12/971,462, dated Sep. 18, 2013, filed Dec. 17, 2010, pp. 24.

U.S. Appl. No. 12/971,462, Notice of Allowance dated Feb. 26, 2015, pp. 13.

Non-final Office Action in U.S. Appl. No. 12/971,638, dated Aug. 30, 2012, filed Dec. 17, 2010, pp. 18.

Final Office Action Issued in U.S. Appl. No. 12/971,638, dated Feb. 25, 2014, filed Dec. 17, 2010, 11 Pages.

Non-final Office Action in U.S. Appl. No. 12/971,638, dated Nov. 18, 2014, pp. 12.

Notice of Allowance in U.S. Appl. No. 12/971,638, dated Apr. 8, 2015, pp. 16.

Non-final Office Action in U.S. Appl. No. 12/971,685, dated Jul. 13, 2012, filed Dec. 17, 2010, pp. 9.

Final Office Action in U.S. Appl. No. 12/971,685, dated Oct. 11, 2012, filed Dec. 17, 2010, pp. 16.

"Notice of Allowance Issued in U.S. Appl. No. 12/972,205", dated Jan. 13, 2016, pp. 17.

Non-Final Office Action Issued in U.S. Appl. No. 12/972,144, dated Jan. 14, 2013, 23 Pages.

Non-Final Office Action Issued in U.S. Appl. No. 12/972,144, dated Jul. 9 2013, 26 Pages.

"Final Office Action Issued in U.S. Appl. No. 12/972,144", dated Nov. 20, 2013, 29 Pages.

"Non-Final Office Action Issued in U.S. Appl. No. 12/972,144", dated Jun. 9, 2014, 16 Pages.

Notice of Allowance Issued in U.S. Appl. No. 12/972,144, dated Dec. 2, 2014, 5 pages.

Notice of Allowance Issued in U.S. Appl. No. 12/972,144, dated Feb. 20, 2015, 5 pages.

Non-Final Office Action Issued in U.S. Appl. No. 12/819,493, dated Mar. 30, 2012, 16 pages.

Final Office Action Issued in U.S. Appl. No. 12/819,493, dated Aug. 15, 2012, 17 pages.

Non-Final Office Action Issued in U.S. Appl. No. 12/819,493, dated Apr. 10, 2013, 17 pages.

Final Office Action Issued in U.S. Appl. No. 12/819,493, dated Nov. 5, 2013, 21 pages.

Non-Final Office Action Issued in U.S. Appl. No. 12/819,493, dated Mar. 21, 2014, 21 pages.

Notice of Allowance Issued in U.S. Appl. No. 12/819,493, dated Oct. 14, 2014, 15 pages.

(56) References Cited

OTHER PUBLICATIONS

"Non-Final Office Action Issued in U.S. Appl. No. 12/971,685", dated Apr. 24, 2014, filed Dec. 17, 2010, 15 Pages.
Non-Final Office Action Issued in U.S. Appl. No. 12/971,685, dated Nov. 20, 2014, 17 Pages.
Notice of Allowance Issued in U.S. Appl. No. 12/971,685, dated Apr. 8, 2015, 8 Pages.
Non-final Office Action in U.S. Appl. No. 12/972,249, dated Jul. 31, 2014, filed Dec. 17, 2010, 30 Pages.
Final Office Action in U.S. Appl. No. 12/972,249, dated Feb. 6, 2015, filed Dec. 17, 2010, 40 Pages.
Notice of Allowance in U.S. Appl. No. 12/972,249, dated Nov. 24, 2015, 15 Pages.
Non-final Office Action in U.S. Appl. No. 12/971,725, dated Aug. 21, 2012, filed Dec. 17, 2010, pp. 11.
Final Office Action in U.S. Appl. No. 12/971,725, dated May 1, 2013, filed Dec. 17, 2010, pp. 15.
Non-final Office Action Issued in U.S. Appl. No. 12/971,725, dated Jun. 23, 2014, filed Dec. 17, 2010, 19 Pages.
Final Office Action Issued in U.S. Appl. No. 12/971,725, dated Jan. 15, 2015, filed Dec. 17, 2010, 21 Pages.
Notice of Allowance Issued in U.S. Appl. No. 12/971,725, dated Jun. 18, 2015, 8 Pages.
Non-final Office Action in U.S. Appl. No. 12/971,782, dated Jul. 13, 2012, filed Dec. 17, 2010, pp. 8.
Final Office Action in U.S. Appl. No. 12/971,782, dated Jan. 31, 2013, filed Dec. 17, 2010, pp. 11.
Non-final Office Action in U.S. Appl. No. 12/971,782, dated Apr. 10, 2014, filed Dec. 17, 2010, 11 Pages.
Final Office Action in U.S. Appl. No. 12/971,782, dated Dec. 4, 2014, pp. 13.
Notice of Allowance in U.S. Appl. No. 12/971,782, dated Apr. 2, 2015, pp. 10.
Non-final Office Action in U.S. Appl. No. 14/790,336, dated Oct. 8, 2015, 10 Pages.
"Non-Final Office Action issued in U.S. Appl. No. 14/793,926", dated Jun. 7, 2016, 12 pages.
"Share-It—Digital River—Quella Business Intelligence Package", Retrieved at: http://www.shareit.com/product.html?cookies=1&productid=300110398&affiliateid=2000122751, Retrieved on: Sep. 21, 2010, 1 Page.
"Final Office Action Issued in U.S. Appl. No. 14/721,353", dated May 18, 2017, 21 Pages.
"Non Final Office Action Issued in U.S. Appl. No. 14/721,353", dated Aug. 3, 2016, 27 Pages.
"Final Office Action Issued in U.S. Appl. No. 14/790,336", dated Jul. 29, 2016, 14 Pages.
"Final Office Action Issued in U.S. Appl. No. 14/790,336", dated Jun. 16, 2017, 21 Pages.
"Non Final Office Action Issued in U.S. Appl. No. 14/790,336", dated Feb. 20, 2018, 23 Pages.
"Non Final Office Action Issued in U.S. Appl. No. 14/790,336", dated Nov. 29, 2016, 19 Pages.
"Final Office Action Issued in U.S. Appl. No. 14/793,926", dated Dec. 14, 2016, 14 Pages.
"Final Office Action Issued in U.S. Appl. No. 15/098,113", dated May 17, 2018, 21 Pages.
"Non Final Office Action Issued in U.S. Appl. No. 15/098,113", dated Jul. 27, 2017, 25 Pages.
Loser, et al., "Situational Business Intelligence", In International Workshop on Business Intelligence for the Real-Time Enterprise, Aug. 24, 2008, pp. 1-11.
Negash, et al., "Business Intelligence", In the Proceedings of Communications of the association for information systems, Feb. 15, 2004, pp. 3190-3199.
Tseng, et al., "The concept of document warehousing for multi-dimensional modeling of textual-based business intelligence", In the Proceedings of Decision Support Systems 42, No. 2, Nov. 1, 2006, pp. 727-744.
Wang, et al., "A knowledge management approach to data mining process for business intelligence", In the Proceedings of Industrial Management & Data Systems, May 23, 2008, pp. 622-634.
"Notice of Allowance Issued in U.S. Appl. No. 14/721,353", dated Dec. 26, 2017 17 Pages.
"Non Final Office Action Issued in U.S. Appl. No. 14/790,336", dated Sep. 21, 2018, 23 Pages.
"Non Final Office Action Issued in U.S. Appl. No. 114/790,336", dated Mar. 18, 2019, 16 Pages.

\* cited by examiner

DATA FEED HAVING CUSTOMIZABLE ANALYTIC AND VISUAL BEHAVIOR

CROSS-REFERENCE TO RELATED APPLICATIONS

This application is a continuation of U.S. patent application Ser. No. 12/971,685, entitled "Data Feed Having Customizable Analytic and Visual Behaviors," filed Dec. 17, 2010, which is incorporated herein by reference. This application is also related to U.S. patent application Ser. No. 12/971,462, entitled "Business Intelligence Document"; Ser. No. 12/971,638, entitled "Data Mining in a Business Intelligence Document"; Ser. No. 12/971,725, entitled "Automated Generation of Analytic and Visual Behavior; Ser. No. 12/971,782, entitled "Decision Application Publication"; Ser. No. 12/972,205, entitled "Representation of an Interactive Document as a Graph of Entities"; and Ser. No. 12/972,249, entitled "Representation of an Interactive Document as a Graph of Entities", each filed Dec. 17, 2010, and each of which are incorporated herein by reference.

BACKGROUND

Business intelligence (BI) refers to a broad category of applications and technologies for gathering, storing, analyzing, and providing access to data to help information workers (IWs) make better business decisions. BI applications typically address activities such as decision support systems, querying, reporting, online analytical processing (OLAP), statistical analysis, forecasting, and data mining. A variety of data sources may be accessed to provide input data relevant to the objectives of each BI application.

Discovering the data sources capable of providing this relevant input data can be difficult and time-consuming. First, a developer typically visits Web sites of numerous data source companies to determine which of them, if any, offer the relevant data in a package and at a price that meets the developer's needs. Second, upon identifying the appropriate data sources and data offered thereby, the developer purchases the data via separate transactions with each data source company. Third, the companies may deliver the purchased data to the developer in different formats, e.g., via Web service, Microsoft EXCEL® spreadsheet, a DVD of CSV data, XML data, RSS feeds, etc.

Furthermore, the step of determining whether a data source company offers the relevant data is particularly challenging. While a data source company may offer a directory of data feeds and display samples of the data to the developer (e.g., in a chart), such companies do not typically allow a developer to interact with a particular data feed, especially in combination with his or her own data and business logic, until he or she pays for the access. As such, the customer is unable to do a trial run with the data feed to make sure it provides the right data for a desired objective.

SUMMARY

Implementations described and claimed herein address the foregoing problems by providing a data marketplace infrastructure that allows a data source company or a third party to associate a data feed to a customizable preview application having analytic and visual features (e.g., business logic and a user interface). A potential customer can use discovery services of the data marketplace infrastructure to identify one or more data feeds offering data in a domain of interest of the potential customer. The data feed can transmit the customizable preview application to allow the potential customer to interact with the sample data from the data feed before purchasing the data. The potential customer may also customize the preview application so as to change the default application behavior in a manner that improves the potential customer's understanding and appreciation of the data feed.

In some implementations, articles of manufacture are provided as computer program products. One implementation of a computer program product provides a computer program storage medium readable by a computer system and encoding a computer program. Other implementations are also described and recited herein.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTIONS OF THE DRAWINGS

DETAILED DESCRIPTIONS

A data marketplace in the described technology represents a cloud-based service or an on-premises/off-premises service that provides a marketplace for information, such as data, web services, and analytics. Content providers can use a data marketplace to make their datasets available to a wide online audience. Developers can write code on any platform to consume datasets received from a data marketplace. Subscribers can use a data marketplace to find datasets that address their needs through rich discovery features and purchase access to such datasets through a consistent transaction and billing framework. Example billing scenarios may include without limitation pay-as-you-go transactions, monthly subscriptions, enterprise volume licensing, pure virtual billing, etc. In one implementation, a data marketplace provides a subscriber with a data feed sourcing data with a consistent presentation and an ability to automatically generate new proxy classes (e.g., to make the communications between the data feed and a data consumer transparent).

Figure 1:
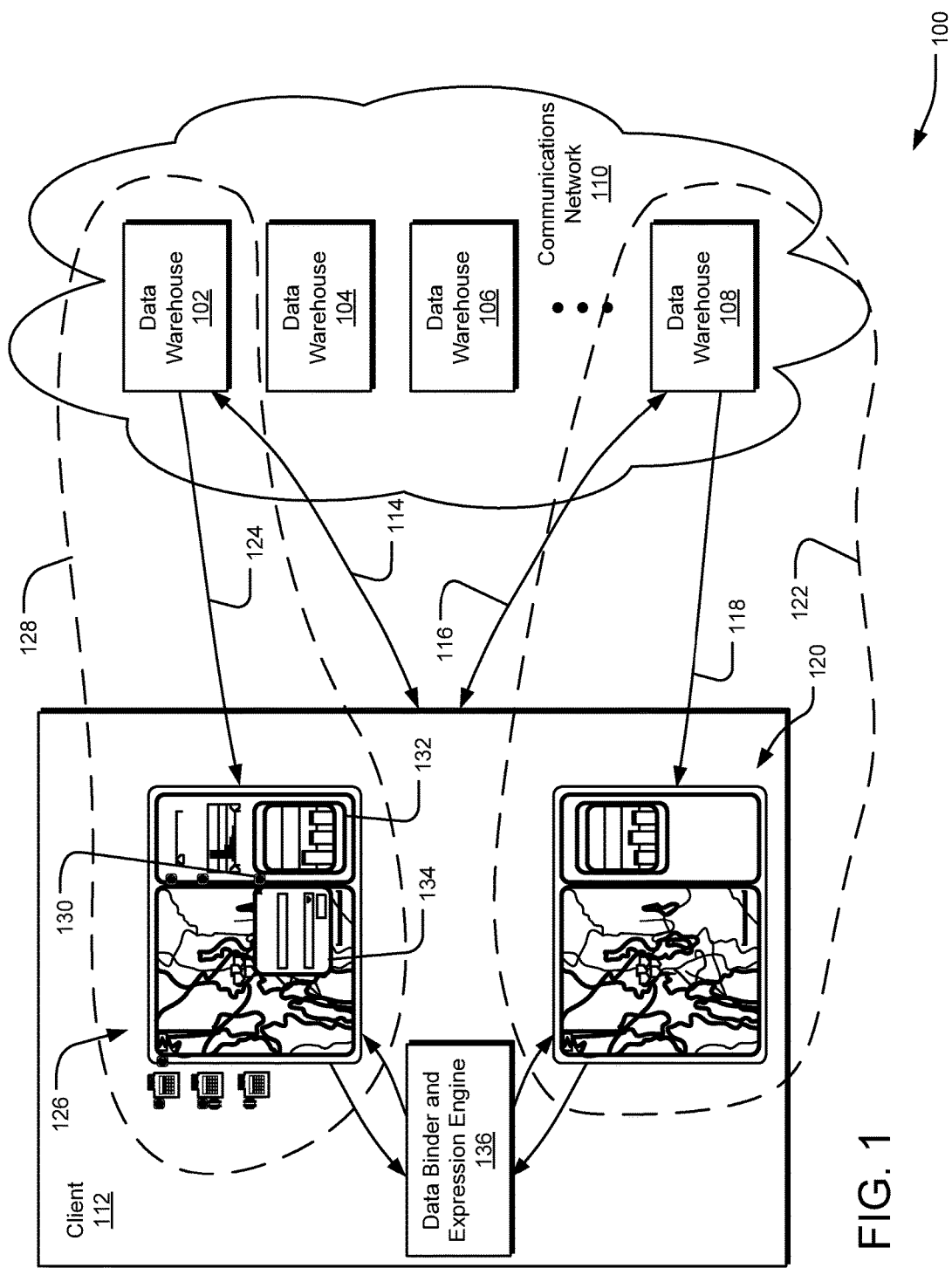
FIG. 1 illustrates an example data marketplace environment.

FIG. 1 illustrates an example data marketplace environment 100. The cloud-computing paradigm provides Web-based processing in which shared resources, software, and information are provided to computing devices (e.g., servers, client systems, mobile devices) on demand over a communications network, such as the Internet. The data marketplace concept provides a significant evolution in discovery, subscription, access, and publishing of data (e.g., both public and commercial) and associated business logic and user interfaces within the "cloud."

In FIG. 1, data warehouses 102, 104, 106, and 108 reside on a communications network 110. Each data warehouse stores and organizes data for access by authorized systems, such as BI clients executing BI applications on the data obtained from the data warehouse. Generally, each data warehouse represents a network-based data source, typically including one or more servers and/or data storage systems. With appropriate authorization, other computing systems can connect with such data sources via the Web to access select data, services, and other resources. Web services represent another example network-based data source. Typically, data feeds made available by a data source are organized in a browse-able directory, from which a data feed of interest may be selected by the prospective subscriber. The described technology enhances discovery of such data feeds and provides a preview application to allow a prospective subscriber to "try out" the data before paying for it.

In one implementation, a BI document defines the BI application using a data structure of arbitrary expressions that can be specified by a non-programmer. In one implementation, a BI application defined by sets of such arbitrary expressions are grouped into distinct entities, which may have input variables and output variables, wherein the relationships among inputs and outputs of these entities defined by the sets of expressions that define the entities. The expressions are generally not unique to any particular system but may be evaluated by either a local or remote system. However, an entity (and therefore the contained expressions) may be designated for local or remote computation on local or remote data, thereby directing computation to an appropriate system based on this designation.

Individual entities may be connected into a pipeline of entities, such that an output of one entity (e.g., an external equation set entity for remote computation) is connected to the input of another entity (e.g., an internal equation set entity of local computation), and so on. The input and output formats of connected entities are matched, such that the data output by one entity is compatible with the input format (e.g., schema) required by the entity to which that data is input. The pipeline-connection of multiple entities allows a user to specify a BI application for evaluating complex and arbitrary combinations of expressions using local or remote data and computation to obtain sophisticated BI solutions.

Furthermore, a non-programmer can develop a BI application defined by such expressions. In some implementations, the skill level adequate for a person to develop a BI application defined by expressions may be similar to the skill level adequate to use a spreadsheet software application, such as Microsoft EXCEL®.

An expression is a symbolic representation of a computation to be performed and may include operators and operands. Example operators of an expression may include without limitation mathematical operators (e.g., addition, subtraction, etc.), relational transformations (e.g., group, ungroup, join, filter, sort, etc.), aggregate transformations over nested structures (e.g., hierarchical filtering), classifiers (e.g., Bayesian algorithm that classified an unstructured set of data), BI aggregations and transformations, and arbitrary or customized transform expressions (e.g., sets of rules, equations, and/or constraints). Example operands of an expression may include without limitation data (e.g., numbers or strings), hierarchical data (such as records, tuples, and sequences), symbols that represent data, and other expressions that resolve to specific data. An expression may thus be recursive in that an expression may be defined by other expressions.

For example, an expression may take the form of a symbolic representation of an algebraic expression, such as $x^2+2xy+y^2$, where x and y are symbols that represent data or other expressions. A symbol may represent any type of data, including without limitation an integer, a rational number, a string, a Boolean, a sequence of data (potentially infinite), a tuple, or a record. In some implementations, a symbol may also represent an irrational number, although in other implementation, a symbol may be prohibited from representing an irrational number. Any expression may take the form of an equation, such as $E=mc^2$, where E, m, and c are symbols representing data or other expressions. An expression may also take the form of a functional definition, such as $f(x)=x^2-1$, where $f$ is a symbol representing the function, x is a symbol representing an operand or argument of the function, and $x^2-1$ is an expression that defines the function. In addition, an expression may take the form of a function invocation, such as $f(3)$, which indicates that the function $f$ is to be invoked with an argument of "3".

An expression may be solved by an expression engine (see expression engine 216 in FIG. 2) to produce a result (e.g., a solution or output). For example, where the symbol x (which is itself an expression) represents the number "3" and the symbol y (which is also an expression) represents the number "2," the expression $x^2+2xy+y^2$ may be solved by replacing the symbols with the values they represent, e.g., $2^2+2\cdot2\cdot3+3^2$, and then applying the operators to the operands to solve the entire expression to equal "25." In another example, where m is a symbol representing the number "2" and c is a symbol representing the number "2," the expression E, defined above, may be solved by replacing E with its definition (e.g., $mc^2$), replacing the symbols m and c with the values they represent (e.g., $2\cdot3^2$) and applying the operators to the operands to solve the expression to equal "18."

In evaluating an expression, the expression engine may apply the operators to the operands to the extent that the operators and operands are defined and to the extent that the expression engine is configured to apply the operators to the operands. For example, where the symbol x represents the number "3" and the symbol "y" is not yet defined, the expression $x^2+2xy+y^2$ may be solved by replacing the known symbol "x" with the value it represents (e.g., $2^2+2\cdot2\cdot y+y^2$) and then applying the operators to the operands to solve the entire expression as $4+4y+y^2$. Where the symbol x represents the number "3" and the symbol y represents the string "hello", the expression $x^2+2xy+y^2$ may be solved as $4+4\cdot hello+hello^2$, since the expression engine may not be configured to perform arithmetic operations on the string "hello".

Each expression can further specify a data source, whether local or remote. For example, an expression in which data values for x are taken from a local data source and data values for y are taken from a remote data source may be declared as follows:

$x^2+2xy+y^2$ where $x$ in local_table_contacts.Age and $y$ in remote_table_contacts.Income Furthermore, each expression can further designate local or remote computation. For example, the computation entity may be specifically identified for an expression as such:

$x^2+2xy+y^2$ local_source.Solver or $x^2+2xy+y^2$|remote_source.Solver

In some implementations, expressions without a computation identifier are deemed local by default.

In some implementations, expression may be declarative. A declarative expression can identify a computation to be performed without specifying how to compute it. A declarative expression may be contrasted with an imperative expression, which may provide an algorithm or other specification for computing the expression. Declarative expressions may be input manually, such as into a field in a spreadsheet tool, or created through a declaration-generating control, such as a visual control element associated with a visualization.

In some implementations, expressions may be immutable. An expression is immutable if it cannot be changed. For example, once a definition is given to an immutable expression, such as if $E=mc^2$ is designated immutable, the expression E cannot later be given a different definition. One advantage of immutability is that a BI application having one or more expressions designated as immutable prevents users of the BI application from altering those expressions. Where expressions are being solved in a distributed execution environment, immutability may be advantageous in that devices can rely on the immutable expression having the same definition throughout the lifetime of the expression. Immutability of expressions can make it easier for independent parts of a BI application to execute in parallel.

As discussed, a BI application may be defined by a data structure of expressions. In one implementation, the BI application is represented by a graph of nodes or entities specified in the BI document, wherein one or more expressions are partitioned into individual entities and connected via related inputs and outputs. Based on the BI document, the BI application can provide spreadsheet-like, incremental recalculation behavior ("recalc"), solving expressions as the data upon which they depend changes. In addition, the BI tool and the BI document are coordinated to allow BI and other operations over heterogeneous complex data, including data sourced from local and remote data sources.

In one implementation, declarative expressions are recorded in the BI document to define one or more entities in the graph, each entity representing without limitation a data structure, an external data source, a control element, an external event source, a visualization, or an update service. In one implementation, each entity transforms its inputs (if any) into its outputs (if any) and is associated with:

zero or more inputs from other entities, each input configured to accept data from outputs of other entities;
  transform expressions that take a set of inputs and create a collection; and
  zero or more outputs accessible by other entities, each output configured to emit output data generated by the entities transforms.

Figure 3:
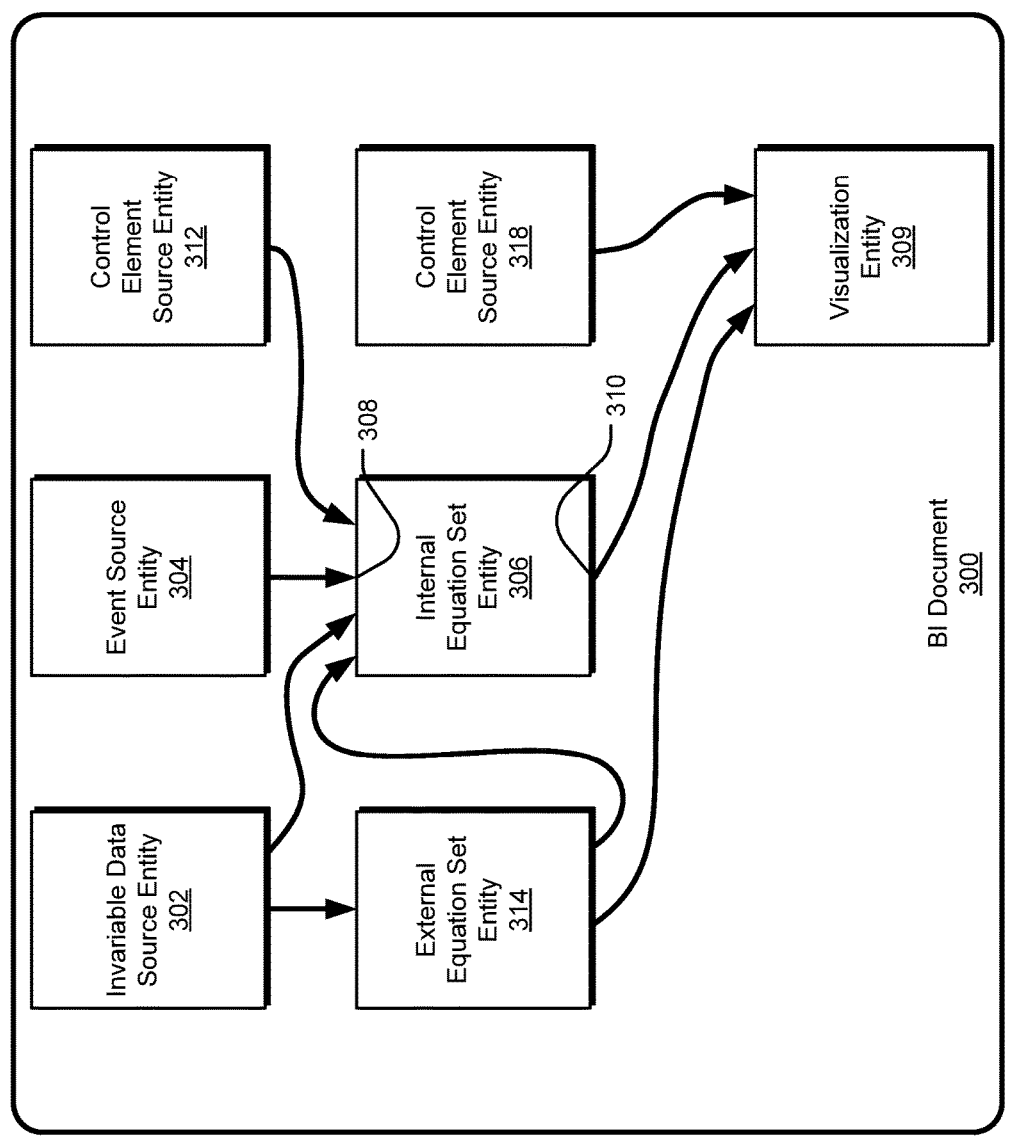
FIG. 3 illustrates an example BI document specifying a graph of connected entities (e.g., transformation nodes).

More details pertaining to entities are described with regard to FIG. 3.

A client 112 (e.g., a client computer system) initially discovers a data feed for possible subscription (e.g., via communications 114 and 116) using a variety of mechanisms. In one implementation, the client 112 provides an identifier (e.g., a URI) of the data warehouse 102 and more specifically, of the specific data feed of interest. In another example, the data warehouse 108 generates and maintains a search index of text residing in expression of the business logic and user interface features of a data feed, wherein the client 112 can submit search queries to search on the text or patterns thereof in order to discover one or more data feeds of interest offered by the data warehouse 108. If the expressions associated with a data feed satisfy the search queries (e.g., as provided in a discovery request), then the data feed can be returned in discovery results to the client 112. A user can then select a data feed from the discovery results to receive a preview applications associated with the selected data feed. In this manner, the data warehouse 108 assists the client 112 in identifying a data feed that may be relevant to a particular business intelligence objective. It should be understood that a web service or other application may be employed to distribute search queries to multiple data sources and to aggregate search results from across the multiple data sources. Other discovery mechanisms for identifying a data feed of interest may also be employed.

In one example, the data warehouse 108 offers a data feed 118, which the client 112 selects (e.g., from a set of search results, from a directory of data feeds, via a provided identifier, etc.). The client 112 can also select to receive a preview application 120 associated with the data feed (e.g., as represented by a sample visualization and underlying business logic and data). The preview application, including any sample data, business logic and user interfaces associated therewith, is specific to the selected data feed, as represented by the dashed line 122 encompassing the preview application 120 and the data warehouse 108. Expressions of the preview application 120 are evaluated at the client 112, providing the client 112 with an interactive preview of sample data, business logic, and user interfaces.

In another example, the data warehouse 102 offers a data feed 124, which the client 112 selects for preview via a preview application 126 of the data feed. The preview application 126, including any business logic and user interfaces associated therewith, is specific to the selected data feed, as represented by the dashed line 128 encompassing the preview and the data warehouse 102. Expressions of the preview application 126 are evaluated at the client 112, providing the client 112 as an interactive preview of some sample data, business logic, and user interfaces. Furthermore, in contrast to the preview application 120 associated with the data feed of the data warehouse 108, the preview application 126 associated with the data feed for data warehouse 102 is shown with customization icons (e.g., icon 130), which allow the client 112 to customize an associated visualization. For example, the customization icon 130 provides editable access to underlying data, business logic and user interfaces associated with a visualization 132, allowing customization (e.g., the altering of business logic expressions) by virtue of a control element 134. The client 112 can therefore manipulate the control element 134 to alter the sample data, business logic, and user interfaces received from the data warehouse 102 in the preview application 126.

A runtime component (e.g., data binder and expression engine 136) evaluates preview applications 120 and 126, including the sample data and expressions representing sample business logic and user interfaces. In this manner, a user at the client 112 can view the preview, including manipulating the present control elements (e.g., a slider control) and, for some preview applications, customize the underlying data, business logic and user interfaces. Furthermore, the client 112 can save the state of such customizations and save them locally or return them to the associated data warehouse.

Furthermore, in one implementation, the expressions and data of the preview application can be in the form of textual data, which can be transferred from the preview application to another BI application at the client (e.g., via copy or cut, and paste logic or drag and drop logic). In this manner, a user can easily use preview applications to develop their own BI applications.

Figure 2:
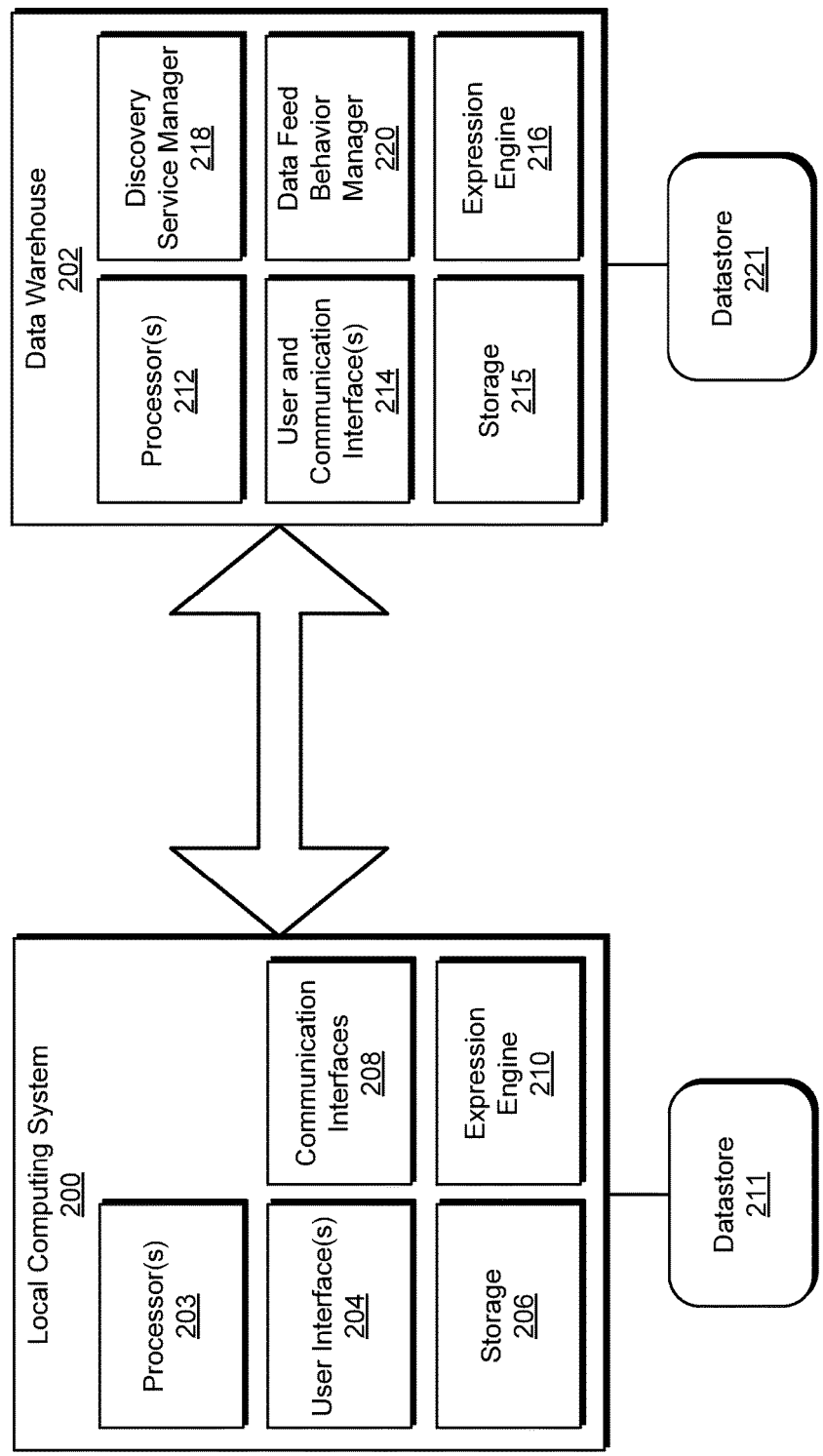
FIG. 2 illustrates components of an example local computing system interacting with components of an example data warehouse in a data marketplace environment.

FIG. 2 illustrates components of an example local computing system 200 interacting with components of an example data warehouse 202 in a data marketplace environment. The local computing system 200 includes one or more processors 203, one or more user interfaces 204 (e.g., a display interface, keyboard/mouse interface, touch screen interface, etc.), and local storage 206 (e.g., local RAM or flash memory, magnetic storage, a solid state drive, etc.), and one or more communication interfaces 208 (e.g., a wireless or wired network interface). In addition, the local computing system 200 includes one or more local runtime components (e.g., expression engine 210) for evaluating expressions and data received in a preview application from the data warehouse 202. The local runtime components may also include without limitation a data-application binder for binding local (e.g., from local data store 211, which may physically reside in the local computing system or be readily accessible in a local area network) and remote data (e.g., accessible from other WAN-connected systems) to expressions of the preview application, text transfer logic (e.g., drag and drop logic, cut/copy and paste logic), and/or search logic providing a client-side interface for search queries and results.

The data warehouse 202 also includes one or more processors 212, one or more user and communication interfaces 214 (e.g., a display interface, keyboard/mouse interface, touch screen interface, a wireless or wired network interface, etc.), and its own local storage 215 (e.g., local RAM or flash memory, magnetic storage, a solid state drive, etc.). In addition, the data warehouse 202 includes one or more runtime components (e.g., data feed behavior manager 220) for providing customizable analytic and visual behavior to a data feed. In one implementation, the data feed behavior manager 220 receives sample data, business logic and user interfaces associated with a selected data feed and forwards them to a requesting client (e.g., the local computing system 200) as a preview application. The runtime components may also include without limitation a discovery service manager 218 for indexing text in business logic and user interface expressions and for processing discovery (e.g., search) requests against such indices, an expression engine 216 for evaluating business logic and user interface expressions, and a data-application binder for binding local (e.g., from local data store 221, which may reside in the data warehouse 202 and remote data (e.g., accessible from other WAN-connected systems) to expressions when preparing the preview application.

FIG. 3 illustrates an example BI document 300 specifying a directed acyclic graph (DAG) of connected entities 302, 304, 306, 309, 312, and 314). The BI document 300 is associated with a particular data feed and specifies the data, business logic, and user interfaces for use in a preview application. Data and business logic may be designated for local evaluation (e.g., at the data warehouse that prepares and sends the preview application or at the local computing system that receives the preview application) or remote evaluation (e.g., at another specified remote system). Each entity is characterized by zero or more inputs (such as input 308), zero or more outputs (such as output 310), and a specified set of expressions (e.g., transforms) that can receive an input from another entity and/or create a collection for output to another entity.

Each entity can represent without limitation a data structure (e.g., a table or a hierarchical table), a terminal entity (e.g., a visualization or update service), a set of expressions with its bindings to identified data, an external data source (e.g., a remote data source, a query-able data source, a non-query-able data source, a control element that provides user interaction to allow data input, a remote service, etc.), and external event sources (e.g., timers). Each entity also defines the format of its one or more inputs and/or outputs. If the entity has an input, the entity further defines the source of the input data. The one or more expressions specified by each entity define transforms to be performed by the entity on its inputs (if any), the result of which is the output (if any) of the entity.

Individual entities may be characterized in a variety of ways, as described with regard to the example list below:

An equation set is represented as an entity having one or more inputs receiving data for computations and having one or more outputs for supplying the results of the computation to a subsequent entity in the directed graph, wherein the expressions specified by the entity represent the computations made on the input data to generate the output data.

An invariable data source may be represented as an entity with no inputs and an output capable of supplying data to a subsequently connected entity.

An external event source is also represented as an entity with no inputs and an output supplying the data resulting from an event (e.g., a timer event indicating that a timer identifies a current date or time, a user input event indicating that a user has entered the number '3'). An external event source is distinguished from an invariable data source because its output may change based on the state of the particular event.

A visualization is represented as an entity with inputs but no outputs (e.g., a terminal entity). A bar chart visualization, for example, may be represented as an entity having one input supplying its title and another input receiving a collection of pairs of categories and values.

An interactive control element may be specified by associating a visualization entity with an external data source entity representing a control element source entity. The control element source entity has no inputs and an output that supplies values corresponding to the user's manipulation of a displayed control element. By manipulating the associated control element (e.g., moving a slider in a single slider control element), the user causes data to be emitted from the output of control element source entity, which can then be connected to the input of a visualization entity to cause the slider movement to be presented visually to the user. An output of the control source entity would commonly also be input to an equation set, for example, to influence associated computations and potentially other visualizations, although other connections are also contemplated.

An updateable source/sink may also be specified by a pair of entities—a "source" entity, which accepts queries as inputs and emits query results as outputs and a "sink" entity representing a destination to which the query results (e.g., "updates") are output. In this manner, the entities represent in combination a single updatable data source/sink that is similar to the invariable data source but which reflects data changes based on changes in underlying data and the queries it receives.

It should be understood that other types of entities and connections are also contemplated in other implementations.

In particular, multiple entities may be connected in a pipeline to produce a complex and arbitrary sequence of expressions designated for local and/or remote computation.

As data that is input to an entity changes, the expression engine re-evaluates the expressions specified by the entity. Accordingly, data changes and re-computation results can ripple through the directed graph, changing the output data that is altered by the re-computations and leaving the outputs of other entities unchanged (where the initial data changes do not ripple to these entities). This incremental change provides a spreadsheet-like recalculation ("recalc") effect—some data changes in the spreadsheet when data is changed, while other data remains unchanged.

Turning back to FIG. 3, the entity 302 represents an invariable data source, having one output but no input, and the entity 304 represents an event source, also having one output but no input, and further having output data that depends on the state of an event. Both the invariable data source entity 302 and the event source entity 304 supply their outputs to an internal equation set entity 306, which specifies one or more expressions for transforming the received data to output data of the entity 306. In this example, the expressions of the internal equation set entity 306 specify local computation and data, not remote computation and data. In contrast, another equation set entity, i.e., external equation set entity 314, specifies one or more expressions designating an external data source. As such, the expressions specified by the entity 314 are communicated to the designated external (e.g., remote) data source for remote computation on remote data. The solutions generated by the remote computation are communicated back to the local computing system for binding to the entity graph.

A control element source entity 312 also has no input and one output. The output data of the control element source entity 312 changes based on the state of an associated control element (e.g., a visual slider control), which can be manipulated by a user. For example, the associated control element may be presented to the user as a slider that the user can slide back and forth within a predetermined range to change the output value of the entity 312. A control element source entity 318 is also connected to the input of a visualization entity 309.

As illustrated, individual entities may be connected into a pipeline, where the local or remote location of the data and the computation for one entity are immaterial to any previous or subsequent entity in the pipeline. For example, an output of the invariable data source entity 302 is connected to the external equation set entity 314 and an output connected to the internal equation set entity 306. The external equation set entity 314 has one output connected to an input of the internal equation set entity 306. It should be understood that the input and output formats of connected entities are compatible to allow a first entity to output data directly to a second entity.

Further, among other connections, inputs to the internal equation set entity 306 are connected to outputs of the invariable data source entity 302, the event source entity 304, and the control element source entity 312. Also, as shown, outputs of the entities 306, 314 and 318 are input to the visualization entity 309, which has three inputs and no outputs. The visualization entity 309 alters a visualization presented to the user based on the data received at its inputs from the entities 306, 314, and 318. In this manner, changes to the outputs of the entities 306, 314, and 318 results in changes to the visual display viewed by user.

Figure 4:
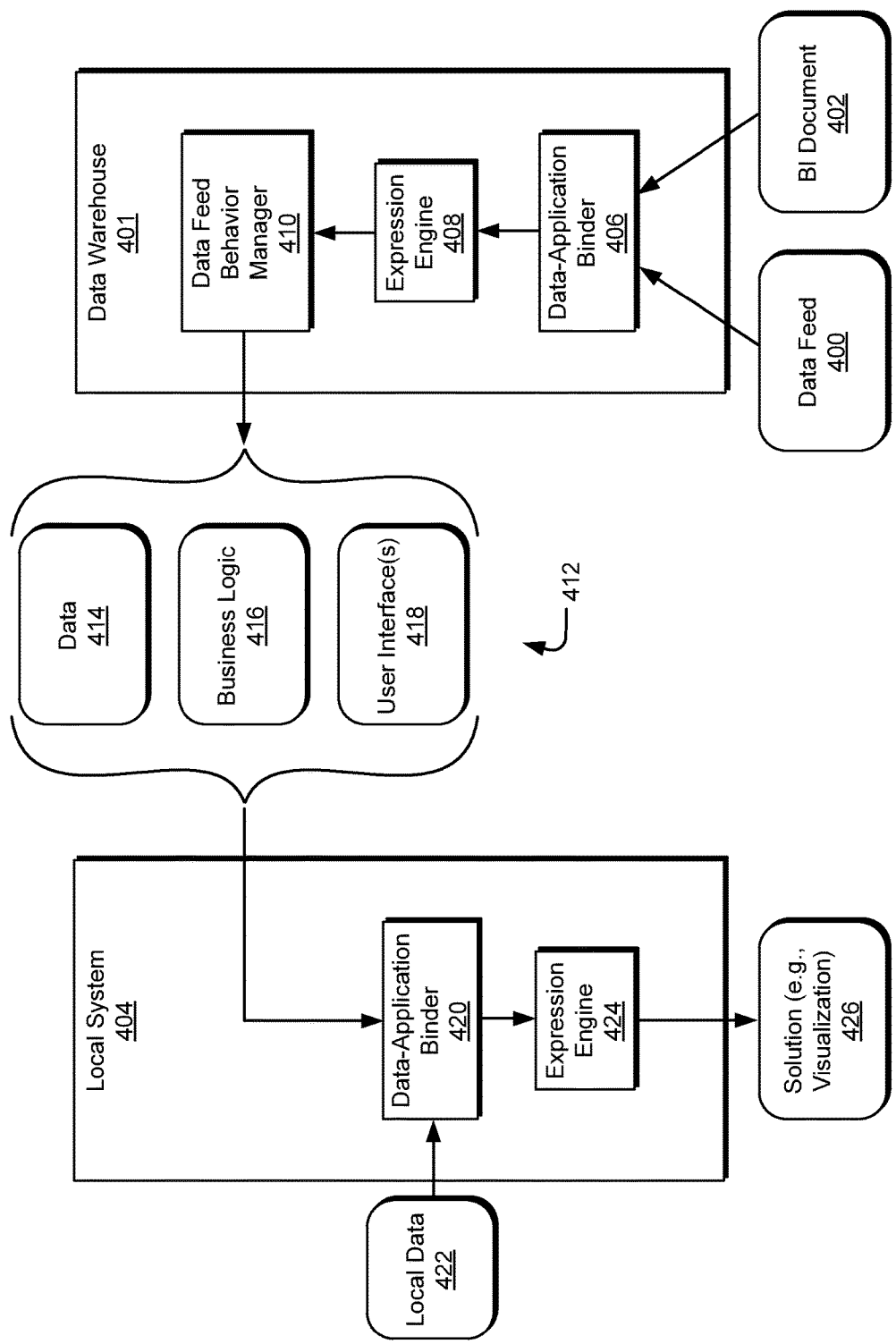
FIG. 4 illustrates an example data feed having customizable analytic and visual behavior.

FIG. 4 illustrates an example data feed 400 having customizable analytic and visual behavior. The data feed 400 is made available by a data warehouse 401, typically through a discovery process. The data feed's behavior is defined by a BI document 402, which in one implementation stores a representation of an entity graph although other representations may be employed. Responsive to selection of the data feed by a local client system 404 (e.g., via a data feed behavior manager 410), the data warehouse 401 inputs the data feed 400 and the BI document 406, which binds sample data from the data feed 400 to the expressions (or a subset of the expressions) recorded in the BI document 402. An expression engine 408 evaluates the expressions based on the available data and passes the expressions (e.g., evaluated or partially evaluated) to the data feed behavior manager 410.

The data feed behavior manager 410 receives the sample data, business logic and user interfaces from the expression engine 408 and forwards them in a preview application 412 to the requesting local system 404. In one implementation, the preview application 412 includes individual expressions and data representing the sample data 414, business logic 416, and user interfaces 418 for the preview. In another implementation, the data feed behavior manager 410 forwards the BI document 402 to the local system 404 as a preview application. In yet another implementation, the data feed behavior manager 410 generates a new BI document that includes representations of and/or references to the sample data, business logic, and user interfaces and forwards it to the local system 404 as a preview application. Other configurations and formats for the preview application are also contemplated.

The local system 404 receives the preview application 412, sending it to a data-application binder 420, which binds local data 422 and any other available data (e.g., local or remote solution data) to the expressions in the preview application 412. A local expression engine 424 evaluates the expressions in light of the bound data and outputs a solution 426 (e.g., a visualization). It should also be understood that the expressions in the preview application 412 may be evaluated locally or remotely, based on references associated with individual entities specified in the preview application 412.

Figure 5:
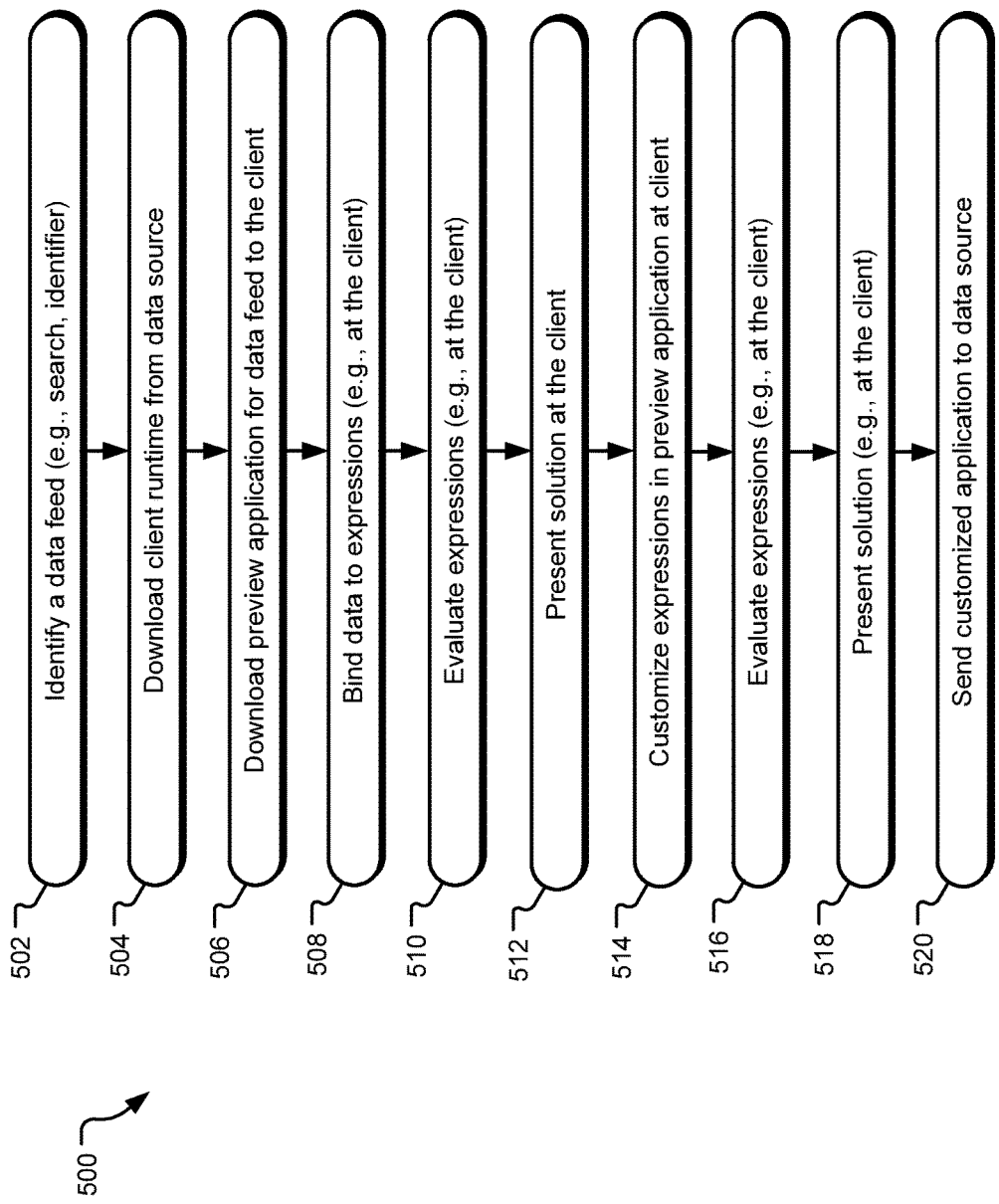
FIG. 5 illustrates example operations for processing an example data feed at a client.

FIG. 5 illustrates example operations 500 for processing an example data feed at a client. An identification operation 502 identifies a data feed of interest through a discovery process (e.g., using a search feature that interacts with an index maintained by a data source, using a specific identifier, via browsing through a directory of data feeds provided by a data source). Accordingly, the discovery process provided by the identification operation 502 assists a user in identifying a data feed that may be relevant to a particular domain of interest. For example, if the user submits a discovery request specifying "consumer expenditures Seattle," the identification operation 502 can search an index of one or more data feeds to identify data feeds satisfying the discovery request. Such data feeds are likely to provide relevant data to the specified business intelligence objective.

A download operating 504 downloads and executes a client-based runtime component capable of binding data to expressions and evaluating expressions to produce solutions. The runtime component may also provide discovery (e.g., a search interface), cut/copy and paste, and/or drag and drop capabilities for the client. If the runtime component is already resident at the client, downloading the runtime component may be bypassed.

Another downloading operation 506 downloads to the client a preview application associated with the data feed of interest. The preview application includes sample data, business logic, and one or more user interfaces for the data feed. A binding operation 508 binds available data to the expressions at the client. An evaluation operation 510 evaluates the expressions (e.g., at the client or a remote system), and a presentation operation 512 presents the resulting solution at the client (e.g., via a visualization). As previously mentioned, it should be understood that certain specified data and expressions may not be available locally or certain data and expressions may be designated for evaluation at a remote data source. For such data and expressions, the binding operations 508 and the evaluation operation 510 may be offloaded to a remote system for execution.

A customization operation 514, another evaluation operation 516, and another presentation operation 518 may also be executed. The preview application includes controls (e.g., a link, a button, etc.) through which a user can access a customization mode. The customization mode allows a user to modify expressions and data of the preview application. In one such mode, a customization user interface feature (such as control element 804 in FIG. 8) is presented to the user to capture new or amended expressions and data, bind them with the existing expressions and data, and re-evaluate the expressions to produce a customized solution. After customization, the client can save the modified version of the preview application for future use. A transmission operation 520 can also send the customized version of the preview application back to the data source, which may store the application and make it available to other users in association with the data feed.

Figure 6:
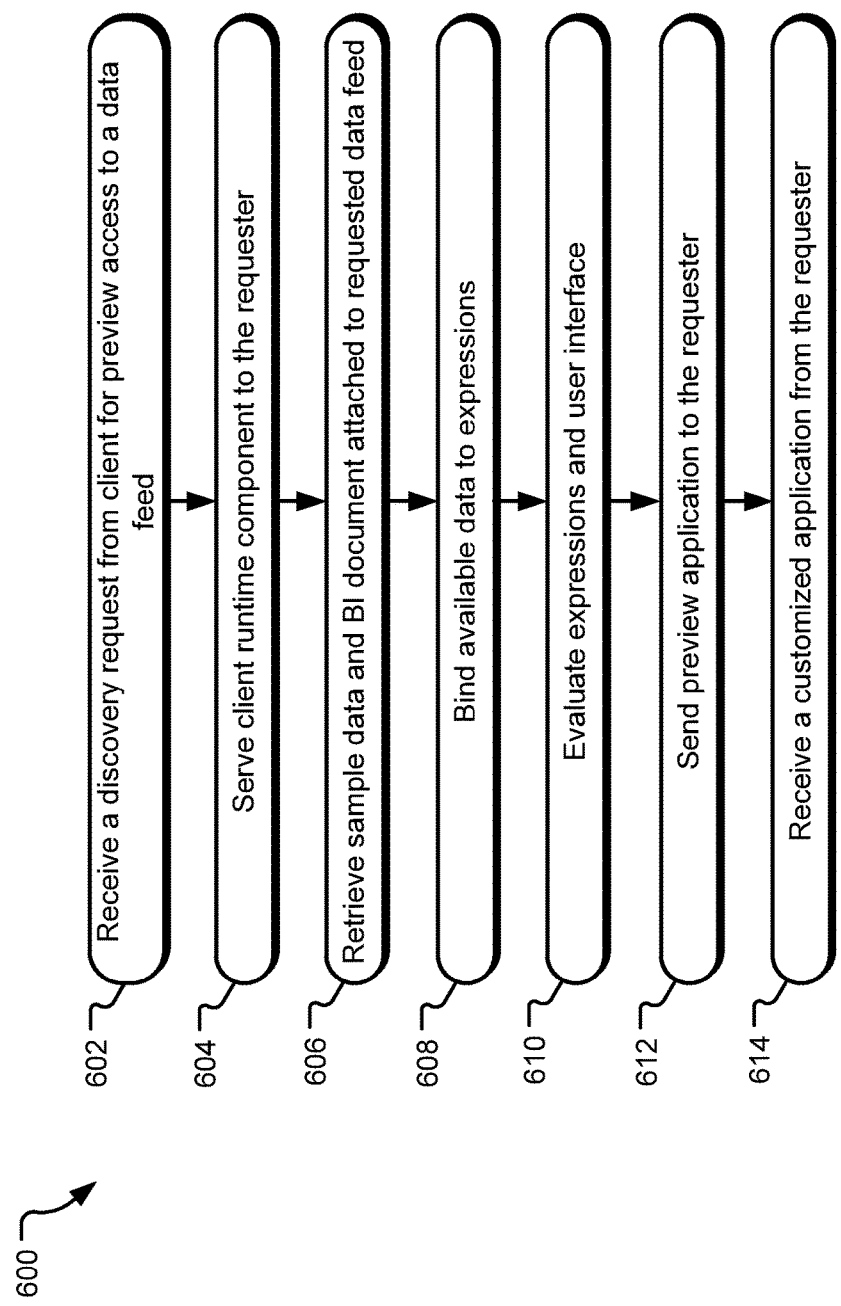
FIG. 6 illustrates example operations for processing an example data feed at a data warehouse.

FIG. 6 illustrates example operations 600 for processing an example data feed at a data warehouse. A receiving operation 602 receives a discovery request from a requester (e.g., a client) for preview access to a data feed offered by a data source. Such a discovery request may include a data feed identifier, search terms, and other properties characterizing the domain of the sample data, business logic, and user interfaces of interest. The discovery request can be applied to indices of one or more data feeds to see if any of the data feeds are associated with expressions that can satisfy the discovery request. If so, such data feeds can be identified to the requester in discovery results. The requester can then select one or more of the identified data feeds for a preview. A serving operation 604 sends a client runtime component to the requester, although if the requester already has the client runtime resident, then this operation may be bypassed.

A retrieval operation 606 retrieves the sample data and BI document associated with the requested data feed. The BI document, or a portion thereof, specifies the expressions and data of the preview application, such as through an entity graph representation. A binding operation 608 binds the available data to the expressions specified in the BI document, and an evaluation operation 610 evaluates the expressions to the extent possible based on the available data. A preview operation 612 sends the resulting preview application to the requesting client. A receiving operation 614 can also receive a customized version of the application from the requester for possible storage by the data source, which may make the customized application available to other requesters in the future.

Figure 7:
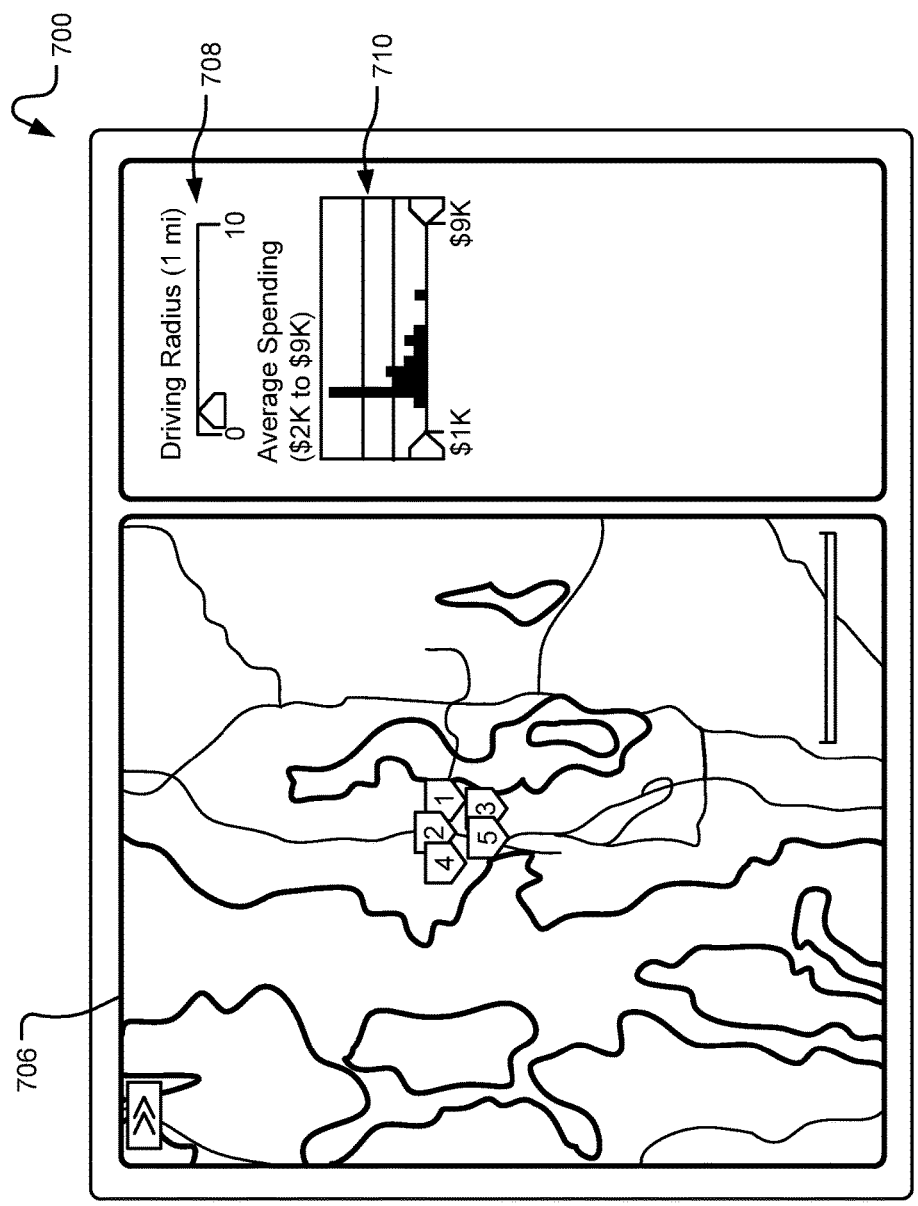
FIG. 7 illustrates example visuals of a preview application associated with a data feed.

FIG. 7 illustrates example visuals 700 of a preview application associated with a data feed. In some cases, such as the map visual 706, map data is combined with solution data (e.g., the symbols marked "1", "2", "3", "4", and "5" on the map). The solution data results from underlying input data, transformations, and other input values configured through user interaction with the single slider control element 708 and the range control 710.

Figure 8:
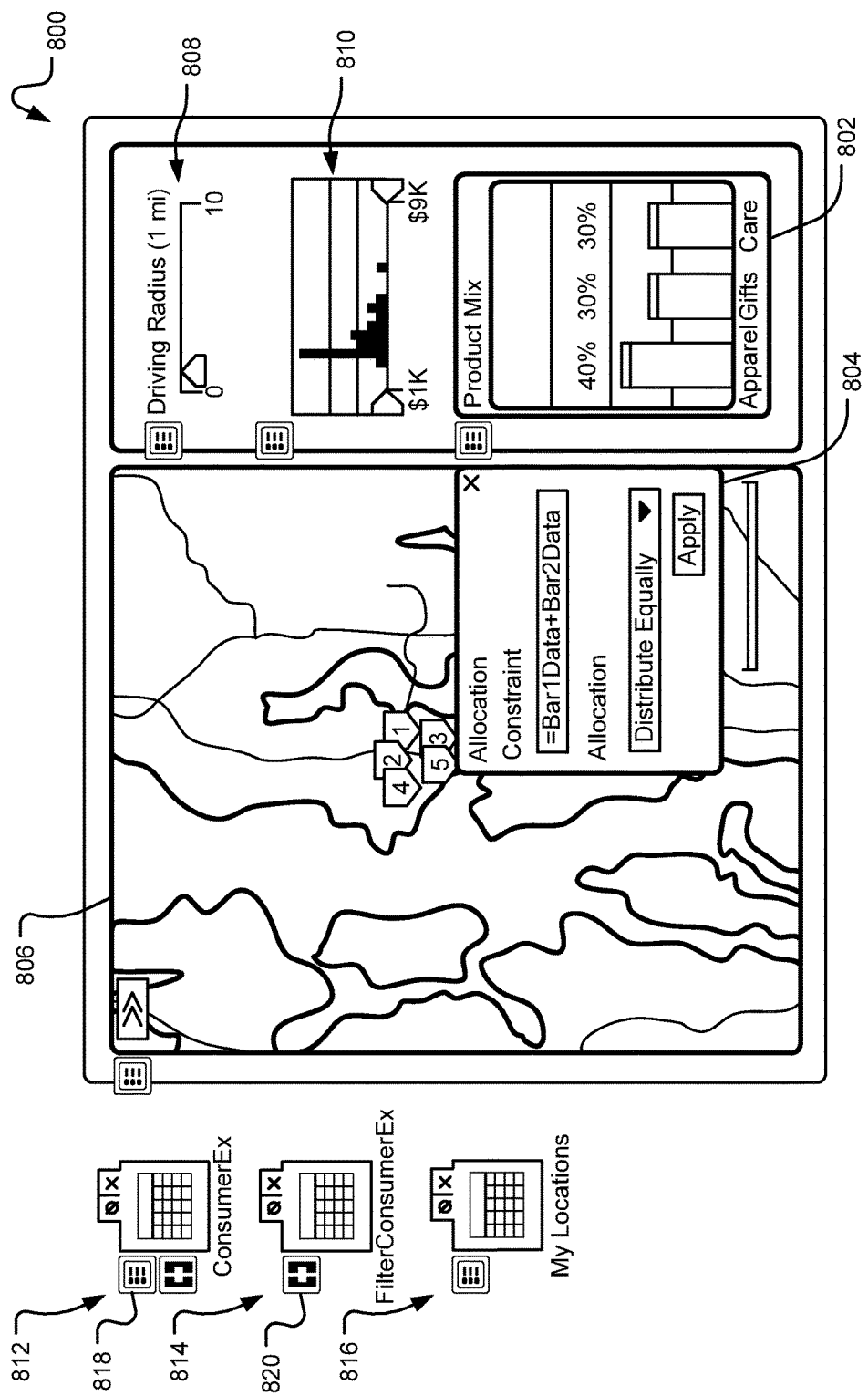
FIG. 8 illustrates example customizable analytic and visual behavior attached to a data feed.

FIG. 8 illustrates example customizable analytic and visual behavior attached to a data feed. Each visual represented by a terminal entity in a graph associated with a BI document presents a user with a view of input data and solutions resulting from associated transformations. In some cases, such as the map visual 806, map data is combined with solution data (e.g., the symbols marked "1", "2", "3", "4", and "5" on the map). The solution data results from underlying input data, transformations, and other input values configured through user interaction with the single slider control element 808 and the range control 810.

The new histogram visual element 802 is also based on input data and transformations, some of which are defined by a user through the control element 804. In the case of the control element 804, a user can configure a "constraint" transformation using a user-entered equation and an "allocation" transformation using a drop down box offering various selections (e.g., "Distribute Equally," "Weighted," etc.) Other transformations may also be applied to the input data in the configuration of the histogram visual 802 or any other visual element.

Other application controls are also shown in FIG. 8. The controls 812, 814, and 816 represent data source entities in a graph of entities. By selecting a data grid control, such as data grid control 818, a user can access the underlying input data of an associated data source. By selecting a logic control, such as logic control 820, a user can access the underlying business logic (e.g., transformations) applicable to the underlying input data.

Figure 9:
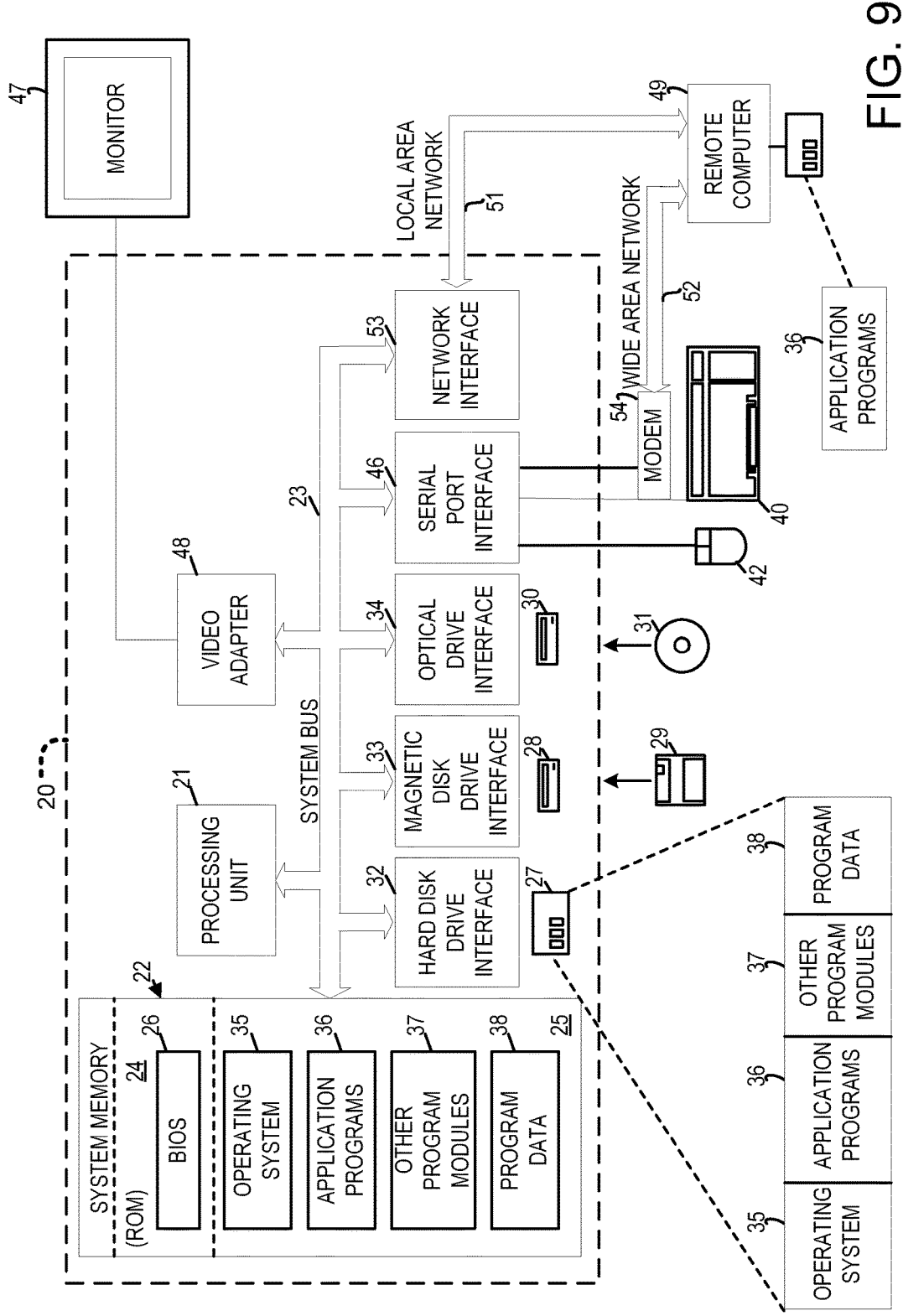
FIG. 9 illustrates an example system that may be useful in implementing the described technology.

FIG. 9 illustrates an example system that may be useful in implementing the described technology. The example hardware and operating environment of FIG. 9 for implementing the described technology includes a computing device, such as general purpose computing device in the form of a gaming console or computer 20, a mobile telephone, a personal data assistant (PDA), a set top box, or other type of computing device. In the implementation of FIG. 9, for example, the computer 20 includes a processing unit 21, a system memory 22, and a system bus 23 that operatively couples various system components including the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, a switched fabric, point-to-point connections, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM, a DVD, or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, random access memories (RAMs), read only memories (ROMs), and the like, may be used in the example operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 9. The logical connections depicted in FIG. 9 include a local-area network (LAN) 51 and a wide-area network (WAN) 52. Such networking environments are commonplace in office networks, enterprise-wide computer networks, intranets and the Internet, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a network adapter, a type of communications device, or any other type of communications device for establishing communications over the wide area network 52. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are example and other means of and communications devices for establishing a communications link between the computers may be used.

In an example implementation, an expression engine, a data feed behavior manager, a discover services manager, and other modules and services may be embodied by instructions stored in memory 22 and/or storage devices 29 or 31 and processed by the processing unit 21. Source data, BI documents, preview applications, expressions, and other data may be stored in memory 22 and/or storage devices 29 or 31 as persistent datastores. Further, local computing systems, remote data sources and/or services, and other associated logic represent hardware and/or software configured to provide BI functionality for network-connected systems. Such services may be implemented using a general purpose computer and specialized software (such as a server executing service software), a special purpose computing system and specialized software (such as a mobile device or network appliance executing service software), or other computing configurations.

Some embodiments may comprise an article of manufacture. An article of manufacture may comprise a storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. In one embodiment, for example, an article of manufacture may store executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language.

The embodiments of the invention described herein are implemented as logical steps in one or more computer systems. The logical operations of the present invention are implemented (1) as a sequence of processor-implemented steps executing in one or more computer systems and (2) as interconnected machine or circuit modules within one or more computer systems. The implementation is a matter of choice, dependent on the performance requirements of the computer system implementing the invention. Accordingly, the logical operations making up the embodiments of the invention described herein are referred to variously as operations, steps, objects, or modules. Furthermore, it should be understood that logical operations may be performed in any order, unless explicitly claimed otherwise or a specific order is inherently necessitated by the claim language.

The above specification, examples, and data provide a complete description of the structure and use of exemplary embodiments of the invention. Since many embodiments of the invention can be made without departing from the spirit and scope of the invention, the invention resides in the claims hereinafter appended. Furthermore, structural features of the different embodiments may be combined in yet another embodiment without departing from the recited claims.

What is claimed is:

1. A method of a data warehouse for providing access to a data feed, the method comprising:
providing access to any of a plurality of data feeds accessible through the data warehouse, each of the plurality of data feeds being associated with at least one of a plurality of domains of interest, wherein each of the plurality of data feeds is individually accessible through the data warehouse by a third-party, and wherein access to any of the plurality of data feeds is conditioned upon a third-party's purchase of access to the data feed;
providing one or more customizable preview applications for each of the plurality of data feeds, wherein each preview application comprises sample data, business logic, and one or more user interfaces for an associated data feed, and provides a preview of the sample data of the associated data feed, and wherein each preview application specifically operates on data of an associated data feed;
receiving a discovery request from the third-party, the discovery request specifying a domain of interest of the plurality of domains of interest;
identifying a set of data feeds of the plurality of data feeds corresponding to the specified domain of interest of the discovery request;
providing selection information regarding the identified set of data feeds to the third-party in response to the discovery request;
receiving, from the third-party, a selection of a data feed of interest, the selected data feed of interest being one of the identified set of data feeds; and
in response to the third-party's selection of the selected data feed, providing a preview application associated with the selected data feed and sample data representative of the selected data feed of interest to the third-party.

2. The method of claim 1, wherein each preview application comprises a data structure of a plurality of expressions specifically directed to operate on data of the selected data feed, each expression comprising a symbolic representation of a computation to be performed.

3. The method of claim 2, wherein the discovery request includes one or more search terms for identifying the domain of interest.

4. The method of claim 3, wherein identifying a set of data feeds corresponding to the specified domain of interest of the discovery request comprises searching for the search terms of the discovery request in an index of terms within the plurality of expressions of the preview application.

5. The method of claim 4 further comprising:
receiving a customized preview application from the third-party, wherein the customized preview application is a customized version of the preview application provided to the third-party; and
associating the customized preview application as a preview application of the selected data feed.

6. The method of claim 5, wherein an expression of the plurality of expressions comprises an algebraic expression.

7. The method of claim 5, wherein an expression of the plurality of expressions comprises a relational transformation of data.

8. The method of claim 5, wherein an expression of the plurality of expressions comprises an aggregational transformation of data.

9. The method of claim 5, wherein an expression of the plurality of expressions comprises a Boolean expression.

10. The method of claim 5, wherein an expression of the plurality of expressions comprises a classification of data.

11. A computer-readable memory device storing computer-executable instructions for execution on a computer processor that, in execution, carry out a method comprising:
providing a plurality of data feeds, each of the plurality of data feeds being associated with one of a plurality of domains of interest, wherein each of the plurality of data feeds is individually accessible by a third-party, and wherein access to any of the plurality of data feeds is conditioned upon a third-partys purchase of access to the data feed;
providing a plurality of customizable preview applications, wherein each of the plurality of preview applications comprises sample data, business logic, and one or more user interfaces for an associated data feed of the plurality of data feeds, and provides a preview of sample data specific to the associated one data feed, and wherein each preview application comprises a plurality of expressions specifically directed to operate on data of the associated data feed, each expression comprising a symbolic representation of a computation to be performed;
receiving a discovery request from a third-party, the discovery request specifying a domain of interest of the plurality of domains of interest;
identifying a set of data feeds of the plurality of data feeds corresponding to the specified domain of interest of the discovery request;
providing selection information regarding the identified set of data feeds to the third-party in response to the discovery request;
receiving, from the third-party, a selection of a data feed of interest, the selected data feed of interest being one of the identified set of data feeds; and
in response to the third-party's selection of the selected data feed, providing a preview application associated with the selected data feed and sample data representative of the selected data feed of interest to the third-party.

12. The computer-readable medium of claim 11, wherein the discovery request includes one or more search terms for identifying the domain of interest.

13. The computer-readable medium of claim 12, wherein identifying a set of data feed corresponding to the specified domain of interest of the discovery request comprises searching for the search terms of the discovery request in an index of terms within the plurality of expressions of the preview application.

14. The computer-readable medium of claim 13, wherein the method further comprises:
receiving a customized preview application from the third-party, wherein the customized preview application is a customized version of the preview application provided to the third-party; and
associating the customized preview application as a preview application of the selected data feed.

15. The computer-readable medium of claim 14, wherein an expression of the plurality of expressions comprises an algebraic expression.

16. The computer-readable medium of claim 14, wherein an expression of the plurality of expressions comprises a transformation of data.

17. The computer-readable medium of claim 14, wherein an expression of the plurality of expressions comprises a Boolean expression.

18. The computer-readable medium of claim 14, wherein an expression of the plurality of expressions comprises a classification of data.

19. A computing system comprising one or more processors coupled to one or more memories, wherein the one or more processors execute instructions stored in the one or more memories as part of or in conjunction with additional components to cause the one or more processors to:
provide a plurality of data feeds, each of the plurality of data feeds being associated with one of a plurality of domains of interest, wherein each of the plurality of data feeds is individually accessible by a third-party, and wherein access to any of the plurality of data feeds is conditioned upon a third-party's purchase of access to the data feed;
provide a plurality of customizable preview applications, wherein each of the plurality of preview applications comprises sample data, business logic, and one or more user interfaces for an associated data feed of the plurality of data feeds, and provides a preview of sample data specific to the associated one data feed, and wherein each preview application comprises a plurality of expressions specifically directed to operate on data of the associated data feed, each expression comprising a symbolic representation of a computation to be performed;
receive a discovery request from a third-party, the discovery request specifying a domain of interest of the plurality of domains of interest;
identify a set of data feeds of the plurality of data feeds corresponding to the specified domain of interest of the discovery request;
provide selection information regarding the identified set of data feeds to the third-party in response to the discovery request;
receive, from the third-party, a selection of a data feed of interest, the selected data feed of interest being one of the identified set of data feeds; and
in response to receiving a selection of a data feed from the requester, transmit to the third-party a preview application specifically configured to interact with the selected data feed.

20. The computing system of claim 19, wherein the executed instructions further cause the one or more processors to:
receive a customized preview application corresponding to the identified data feed from the third-party; and
associate the customized preview application as a preview application of the selected data feed.

* * * * *